United States Patent
Veluswamy et al.

(10) Patent No.: US 11,507,321 B1
(45) Date of Patent: Nov. 22, 2022

(54) MANAGING QUEUE LIMIT OVERFLOW FOR DATA STORAGE DEVICE ARRAYS

(71) Applicant: Western Digital Technologies, Inc., San Jose, CA (US)

(72) Inventors: Senthil Kumar Veluswamy, Bangalore (IN); Rahul Gandhi Dhatchinamoorthy, Bangalore (IN); Kumar Ranjan, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/338,952

(22) Filed: Jun. 4, 2021

(51) Int. Cl.
*G06F 3/06* (2006.01)
*G06F 13/16* (2006.01)

(52) U.S. Cl.
CPC .......... *G06F 3/0659* (2013.01); *G06F 3/0613* (2013.01); *G06F 3/0688* (2013.01); *G06F 13/1668* (2013.01)

(58) Field of Classification Search
CPC .... G06F 3/0659; G06F 3/0613; G06F 3/0688; G06F 13/1668
See application file for complete search history.

(56) References Cited

U.S. PATENT DOCUMENTS

| | | | | |
|---|---|---|---|---|
| 6,112,265 A | * | 8/2000 | Harriman | G06F 3/0674 710/39 |
| 9,563,480 B2 | | 2/2017 | Messerli et al. | |
| 2004/0103261 A1 | | 5/2004 | Honda et al. | |
| 2004/0133707 A1 | | 7/2004 | Yoshiya et al. | |
| 2005/0108375 A1 | | 5/2005 | Hallak-Stamler | |
| 2007/0174566 A1 | | 7/2007 | Kaneda et al. | |
| 2012/0260032 A1 | * | 10/2012 | Chiu | G06F 13/1626 711/105 |
| 2013/0297912 A1 | * | 11/2013 | Tran | G06F 9/3885 712/E9.028 |
| 2015/0006733 A1 | | 1/2015 | Khan et al. | |
| 2016/0359761 A1 | * | 12/2016 | Sussman | H04L 47/52 |
| 2016/0371145 A1 | * | 12/2016 | Akutsu | G06F 11/1076 |
| 2020/0004701 A1 | | 1/2020 | Subbarao et al. | |
| 2021/0109659 A1 | * | 4/2021 | Bavishi | G06F 3/0656 |

OTHER PUBLICATIONS

Veluswamy et al., "Dynamic Allocation of Storage Resources Based on Connection Type," U.S. Appl. No. 17/182,816, filed Feb. 23, 2021, 63 pgs.

* cited by examiner

*Primary Examiner* — Tuan V Thai
(74) *Attorney, Agent, or Firm* — Patent Law Works LLP

(57) ABSTRACT

Systems and methods for managing queue limit overflow for data storage device arrays are described. Host storage connections are allocated by host connection identifier and storage device processing queues are allocated by completion connection identifier through a connection virtualization layer. Storage commands may be directed to a processing queue based on the host connection identifier. Responsive to determining that the processing queue has reached its queue depth limit, another processing queue is determined for receiving the storage command without indicating processing queue overflow to the host device.

18 Claims, 9 Drawing Sheets

MANAGING QUEUE LIMIT OVERFLOW FOR DATA STORAGE DEVICE ARRAYS

TECHNICAL FIELD

The present disclosure generally relates to storage systems supporting a plurality of hosts and, more particularly, to dynamic allocation of storage resources in response to host requests.

BACKGROUND

Multi-device storage systems utilize multiple discrete data storage devices, generally disk drives (solid-state drives (SSD), hard disk drives (HDD), hybrid drives, tape drives, etc.) for storing large quantities of data. These multi-device storage systems are generally arranged in an array of drives interconnected by a common communication fabric and, in many cases, controlled by a storage controller, redundant array of independent disks (RAID) controller, or general controller, for coordinating storage and system activities across the array of drives. The data stored in the array may be stored according to a defined RAID level, a combination of RAID schemas, or other configurations for providing desired data redundancy, performance, and capacity utilization. In general, these data storage configurations may involve some combination of redundant copies (mirroring), data striping, and/or parity (calculation and storage), and may incorporate other data management, error correction, and data recovery processes, sometimes specific to the type of disk drives being used (e.g., solid-state drives versus hard disk drives).

There is an emerging trend in the storage industry to deploy disaggregated storage. Disaggregated storage brings significant cost savings via decoupling compute and storage node life cycles and allowing different nodes or subsystems to have different compute to storage ratios. In addition, disaggregated storage allows significant flexibility in migrating compute jobs from one physical server to another for availability and load balancing purposes.

Disaggregated storage has been implemented using a number of system architectures, including the passive Just-a-Bunch-of-Disks (JBOD) architecture, the traditional All-Flash Architecture (AFA), and Ethernet Attached Bunch of Flash (EBOF) disaggregated storage, which typically uses specialized chips from Mellanox or Kazan to translate commands from external NVMe-OF (Non-Volatile Memory Express over Fabrics) protocol to internal NVMe (NVM Express) protocol. These architectures may be configured to support various Quality of Service (QoS) metrics and requirements to support host applications, often supporting a plurality of host systems with different workload requirements.

The systems may be deployed in data centers to support cloud computing services, such as platform as a service (PaaS), infrastructure as a service (IaaS), and/or software as a service (SaaS). Data centers and their operators may offer defined (and sometime contractually guaranteed) QoS with responsive, on-demand provisioning of both hardware and software resources in multi-tenant systems. Various schemes for dynamic resource allocation may be used at different levels of the system hierarchies and roles. Prior resource allocation schemes may not provide optimal allocation of non-volatile memory resources among a plurality of hosts with differing workloads in a multi-tenant system.

In some architectures, such as NVMe, host storage connections may be established with individual data storage devices through a fabric network based on a request system that allocates processing queues, such as NVMe queue-pairs, to the host storage connections on a one-to-one basis. Data storage devices may be configured with a fixed number of queue-pairs and fixed storage command queue depths supported by those queue pairs. Allocation of a queue-pair to a host storage connection may result in inefficient use of storage resources among hosts with varying usage patterns, particularly if hosts are not diligent about load balancing and/or terminating unused connections.

Therefore, there still exists a need for storage systems with flexible and dynamic resource allocation configurations for back-end non-volatile memory resources.

SUMMARY

Various aspects for managing queue limit overflows in data storage device arrays are described. More particularly, a connection virtualization layer may be used to dynamically allocate host storage connections and storage commands through the host storage connections. This may enable storage resources to be pooled across connections and enable the system to support more connections and/or more storage commands through those connections than the configured limits of the individual data storage devices would suggest.

One general aspect includes a system including: a processor; a memory; a storage interface configured to communicate with a plurality of data storage devices, where each storage device of the plurality of data storage devices is configured with a queue count limit corresponding to a number of processing queues supported by the storage device and a queue depth limit for each processing queue supported by the storage device; a host interface configured to communicate with a plurality of host devices; and a connection virtualization engine. The connection virtualization engine is configured to: allocate, from a host device among the plurality of host devices, a host storage connection having a host connection identifier; allocate, to a target storage device among the plurality of data storage devices, a first processing queue having a first completion connection identifier; receive, from the host device, a storage command directed to the first processing queue of a target storage device; determine whether the first processing queue of the target storage device has reached the queue depth limit of the first processing queue; determine, responsive to determining that the first processing queue of the target storage device has reached the queue depth limit of the first storage queue, a second processing queue to receive the storage command, where the second processing queue has a second completion connection identifier; and send the storage command to the second processing queue.

Implementations may include one or more of the following features. The connection virtualization engine may be further configured to: determine, for the plurality of data storage devices, an aggregate queue count limit; determine, for the plurality of data storage devices, an aggregate command processing pool based on the aggregate queue count limit and the queue depth limit for each processing queue; determine a total active command count for active storage commands allocated to the plurality of data storage devices; compare the total active command count to the aggregate command processing pool; and prevent, responsive to the total active command count being less than the aggregate command processing pool, the host device from receiving a queue full error. The connection virtualization engine may be further configured to receive, from the target storage device, a queue full indicator for the first processing queue; and determining whether the first processing queue of the target storage device has reached the queue depth limit of the first processing queue may be based on receiving the queue full indicator. The connection virtualization engine may be further configured to manage a plurality of host storage connections for the target storage device; each host storage connection of the plurality of host storage connections may include a corresponding completion connection identifier and a corresponding processing queue; and the second processing queue and the second completion connection identifier may be associated with a second host storage connection of the target storage device. The connection virtualization engine may be further configured to manage a plurality of host storage connections for the plurality of data storage devices; and the second processing queue and associated second completion connection identifier may be associated with a second host storage connection of a second target storage device from the plurality of data storage devices. The connection virtualization engine may be further configured to: determine, for a storage connection request from the host device, a first host connection identifier; and determine, based on the first host connection identifier, the first storage queue of the target storage device. The connection virtualization engine may be further configured to: store, for the storage command, a command tracker associating the storage command, the host connection identifier, and the first completion connection identifier corresponding to the first processing queue; and update, responsive to determining the second processing queue to receive the storage command, the command tracker to include the second completion connection identifier corresponding to the second processing queue. The connection virtualization engine may be further configured to: determine, for a storage connection request from the host device, a first host connection identifier; monitor, from the host device, a plurality of pending storage commands associated with the first host connection identifier; determine a plurality of host storage connections among the plurality of data storage devices; and allocate the plurality of pending storage commands among the plurality of host storage connections and corresponding processing queues of the plurality of data storage devices, where a count of the pending storage commands associated with the first host connection identifier exceeds the queue depth limit of the first processing queue. The connection virtualization engine may be further configured to: manage, from the plurality of host devices, a plurality of host connection requests with corresponding host connection identifiers; manage, for the plurality of host devices, a plurality of storage device connections with corresponding completion connection identifiers; and allocate, based on available storage device resources, the plurality of storage device connections between host connection identifiers and completion connection identifiers, where a count of the pending storage commands associated with the first host connection identifier exceed the queue depth limit of the first processing queue and at least one processing queue corresponding to a completion connection identifier includes pending storage commands associated with a plurality of host connection identifiers. The host interface and the storage interface may be configured for a non-volatile memory express storage protocol; each storage device connection of the plurality of storage device connections may be configured as a queue-pair allocation; and the connection virtualization engine may be further configured to allocate the plurality of storage device connections to at least one target storage device of the plurality of data storage devices in excess of the queue count limit and process storage commands to at least one host connection identifier in excess of the queue depth limit.

Another general aspect includes a computer-implemented method including: allocating, from a host device among a plurality of host devices, a host storage connection having a host connection identifier; allocating, to a target storage device among a plurality of data storage devices, a first processing queue having a first completion connection identifier and a queue depth limit; receiving, from the host device, a storage command directed to the first processing queue of the target storage device; determining whether the first processing queue of the target storage device has reached the queue depth limit of the first processing queue; determining, responsive to determining that the first processing queue of the target storage device has reached the queue depth limit of the first storage queue, a second processing queue to receive the storage command, where the second processing queue has a second completion connection identifier; and sending the storage command to the second processing queue.

Implementations may include one or more of the following features. The computer-implemented method may further include: determining, for the plurality of data storage devices, an aggregate queue count limit; determining, for the plurality of data storage devices, an aggregate command processing pool based on the aggregate queue count limit and a queue depth limit for each processing queue of the plurality of data storage devices; determining a total active command count for active storage commands allocated to the plurality of data storage devices; comparing the total active command count to the aggregate command processing pool; and preventing, responsive to the total active command count being less than the aggregate command processing pool, the host device from receiving a queue full error. The computer-implemented method may further include: managing a plurality of host storage connections for the target storage device, where: each host storage connection of the plurality of host storage connections includes a corresponding completion connection identifier and a corresponding processing queue; and the second processing queue and the second completion connection identifier are associated with a second host storage connection of the target storage device. The computer-implemented method may further include: determining, for a storage connection request from the host device, a first host connection identifier; and determining, based on the first host connection identifier, the first storage queue of the target storage device. The computer-implemented method may further include: storing, for the storage command, a command tracker associating the storage command, the host connection identifier, and the first completion connection identifier corresponding to the first processing queue; and updating, responsive to determining the second processing queue to receive the storage command, the command tracker to include the second completion connection identifier corresponding to the second processing queue. The computer-implemented method may further include: determining, for a storage connection request from the host device, the host connection identifier; monitoring, from the host device, a plurality of pending storage commands associated with the host connection identifier; determining a plurality of host storage connections among the plurality of data storage devices; and allocating the plurality of pending storage commands among the plurality of host storage connections and corresponding processing queues of the plurality of data storage devices, where a count of the plurality of pending storage commands associated with the host connection identifier exceed the queue depth limit of the first processing queue. The computer-implemented method may further include: managing, from the plurality of host devices, a plurality of host connection requests with corresponding host connection identifiers; managing, for the plurality of host devices, a plurality of storage device connections with corresponding completion connection identifiers; and allocating, based on available storage device resources, the plurality of storage device connections between host connection identifiers and completion connection identifiers, where a count of host connection identifiers exceeds an aggregate queue count limit of the plurality of data storage devices and at least one processing queue corresponding to a completion connection identifier includes pending storage commands associated with a plurality of host connection identifiers.

Still another general aspect includes a storage system including: a processor; a memory; a host interface configured to communicate with a plurality of host devices; a plurality of data storage devices; means for allocating, from a host device among the plurality of host devices, a host storage connection having a host connection identifier; means for allocating, to a target storage device among a plurality of data storage devices, a first processing queue having a first completion connection identifier and a queue depth limit; means for receiving, from the host device, a storage command directed to the first processing queue of the target storage device; means for determining whether the first processing queue of the target storage device has reached the queue depth limit of the first processing queue; means for determining, responsive to determining that the first processing queue of the target storage device has reached the queue depth limit of the first storage queue, a second processing queue to receive the storage command, where the second processing queue has a second completion connection identifier; and means for sending the storage command to the second processing queue.

The various embodiments advantageously apply the teachings of data storage devices and/or multi-device storage systems to improve the functionality of such computer systems. The various embodiments include operations to overcome or at least reduce the issues previously encountered in storage arrays and/or systems and, accordingly, are more reliable and/or efficient than other computing systems. That is, the various embodiments disclosed herein include hardware and/or software with functionality to improve shared access to non-volatile memory resources by host systems in multi-tenant storage systems, such as by using connection virtualization to enable sharing of back-end non-volatile memory resources. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
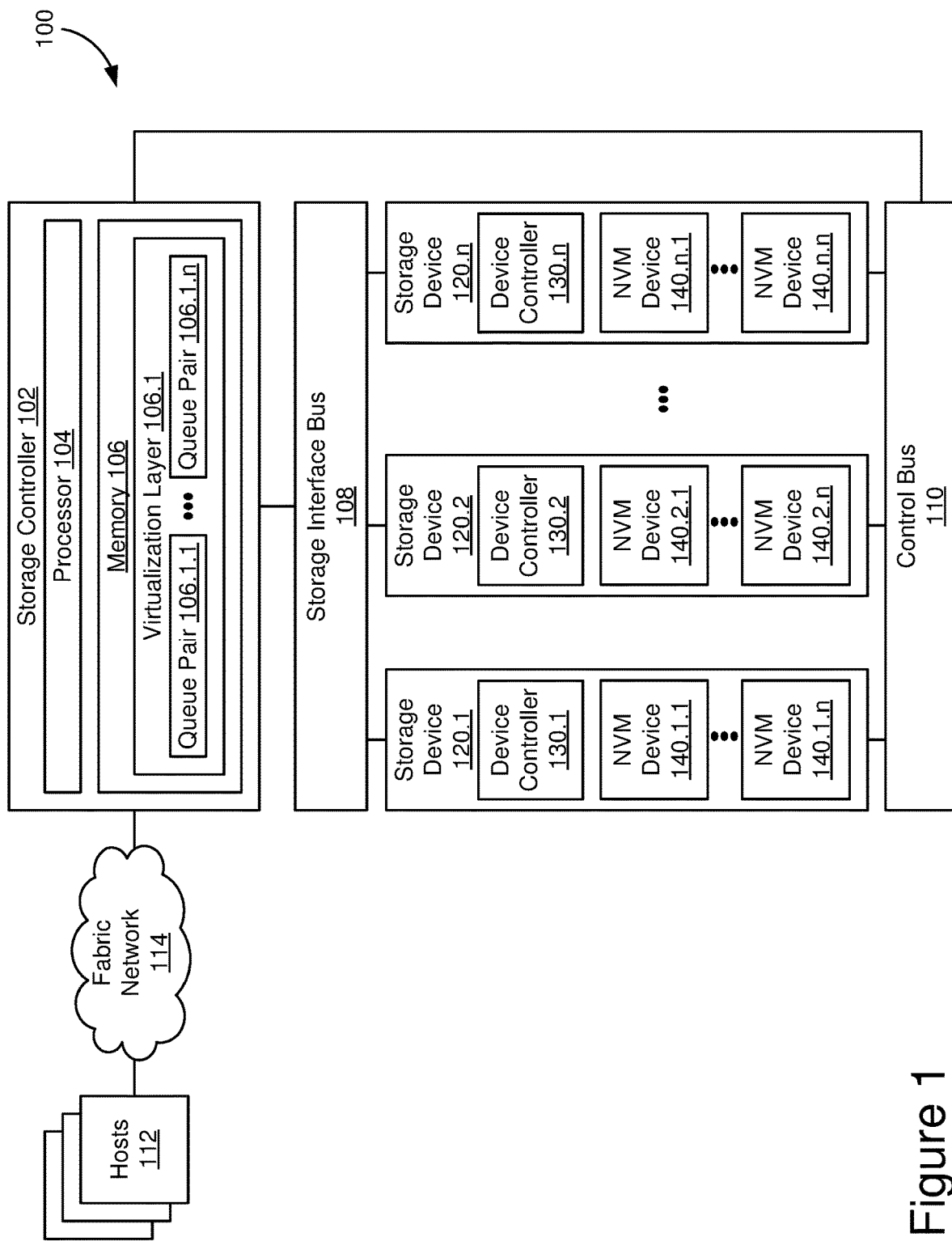
FIG. 1 schematically illustrates a multi-device storage system supporting a plurality of host systems.

FIG. 1 shows an embodiment of an example data storage system 100 with multiple data storage devices 120 supporting a plurality of host systems 112 through storage controller 102. While some example features are illustrated, various other features have not been illustrated for the sake of brevity and so as not to obscure pertinent aspects of the example embodiments disclosed herein. To that end, as a non-limiting example, data storage system 100 may include one or more data storage devices 120 (also sometimes called information storage devices, storage devices, disk drives, or drives) configured in a storage node with storage controller 102. In some embodiments, storage devices 120 may be configured in a server, storage array blade, all flash array appliance, or similar storage unit for use in data center storage racks or chassis. Storage devices 120 may interface with one or more host nodes or host systems 112 and provide data storage and retrieval capabilities for or through those host systems. In some embodiments, storage devices 120 may be configured in a storage hierarchy that includes storage nodes, storage controllers (such as storage controller 102), and/or other intermediate components between storage devices 120 and host systems 112. For example, each storage controller 102 may be responsible for a corresponding set of storage devices 120 in a storage node and their respective storage devices may be connected through a corresponding backplane network or internal bus architecture including storage interface bus 108 and/or control bus 110, though only one instance of storage controller 102 and corresponding storage node components are shown. In some embodiments, storage controller 102 may include or be configured within a host bus adapter for connecting storage devices 120 to fabric network 114 for communication with host systems 112.

In the embodiment shown, a number of storage devices 120 are attached to a common storage interface bus 108 for host communication through storage controller 102. For example, storage devices 120 may include a number of drives arranged in a storage array, such as storage devices sharing a common rack, unit, or blade in a data center or the SSDs in an all flash array. In some embodiments, storage devices 120 may share a backplane network, network switch (es), and/or other hardware and software components accessed through storage interface bus 108 and/or control bus 110. For example, storage devices 120 may connect to storage interface bus 108 and/or control bus 110 through a plurality of physical port connections that define physical, transport, and other logical channels for establishing communication with the different components and subcomponents for establishing a communication channel to host 112. In some embodiments, storage interface bus 108 may provide the primary host interface for storage device management and host data transfer, and control bus 110 may include limited connectivity to the host for low-level control functions.

In some embodiments, storage devices 120 may be referred to as a peer group or peer storage devices because they are interconnected through storage interface bus 108 and/or control bus 110. In some embodiments, storage devices 120 may be configured for peer communication among storage devices 120 through storage interface bus 108, with or without the assistance of storage controller 102 and/or host systems 112. For example, storage devices 120 may be configured for direct memory access using one or more protocols, such as non-volatile memory express (NVMe), remote direct memory access (RDMA), NVMe over fabric (NVMeOF), etc., to provide command messaging and data transfer between storage devices using the high-bandwidth storage interface and storage interface bus 108.

In some embodiments, data storage devices 120 are, or include, solid-state drives (SSDs). Each data storage device 120.1-120.*n* may include a non-volatile memory (NVM) or device controller 130 based on compute resources (processor and memory) and a plurality of NVM or media devices 140 for data storage (e.g., one or more NVM device(s), such as one or more flash memory devices). In some embodiments, a respective data storage device 120 of the one or more data storage devices includes one or more NVM controllers, such as flash controllers or channel controllers (e.g., for storage devices having NVM devices in multiple memory channels). In some embodiments, data storage devices 120 may each be packaged in a housing, such as a multi-part sealed housing with a defined form factor and ports and/or connectors for interconnecting with storage interface bus 108 and/or control bus 110.

In some embodiments, a respective data storage device 120 may include a single medium device while in other embodiments the respective data storage device 120 includes a plurality of media devices. In some embodiments, media devices include NAND-type flash memory or NOR-type flash memory. In some embodiments, data storage device 120 may include one or more hard disk drives (HDDs). In some embodiments, data storage devices 120 may include a flash memory device, which in turn includes one or more flash memory die, one or more flash memory packages, one or more flash memory channels or the like. However, in some embodiments, one or more of the data storage devices 120 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, each storage device 120 includes a device controller 130, which includes one or more processing units (also sometimes called central processing units (CPUs), processors, microprocessors, or microcontrollers) configured to execute instructions in one or more programs.

In some embodiments, the one or more processors are shared by one or more components within, and in some cases, beyond the function of the device controllers. In some embodiments, device controllers 130 may include firmware for controlling data written to and read from media devices 140, one or more storage (or host) interface protocols for communication with other components, as well as various internal functions, such as garbage collection, wear leveling, media scans, and other memory and data maintenance. For example, device controllers 130 may include firmware for running the NVM layer of an NVMe storage protocol alongside media device interface and management functions specific to the storage device. Media devices 140 are coupled to device controllers 130 through connections that typically convey commands in addition to data, and optionally convey metadata, error correction information and/or other information in addition to data values to be stored in media devices and data values read from media devices 140. Media devices 140 may include any number (i.e., one or more) of memory devices including, without limitation, non-volatile semiconductor memory devices, such as flash memory device(s).

In some embodiments, media devices 140 in storage devices 120 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on storage devices 120 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations on storage devices 120, which may also correspond to one or more logical storage locations. In some embodiments, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, files, or other logical data constructs composed of multiple host blocks.

In some embodiments, storage controller 102 may be coupled to data storage devices 120 through a network interface that is part of host fabric network 114 and includes storage interface bus 108 as a host fabric interface. In some embodiments, host systems 112 are coupled to data storage system 100 through fabric network 114 and storage controller 102 may include a storage network interface, host bus adapter, or other interface capable of supporting communications with multiple host systems 112. Fabric network 114 may include a wired and/or wireless network (e.g., public and/or private computer networks in any number and/or configuration) which may be coupled in a suitable way for transferring data. For example, the fabric network may include any means of a conventional data communication network such as a local area network (LAN), a wide area network (WAN), a telephone network, such as the public switched telephone network (PSTN), an intranet, the internet, or any other suitable communication network or combination of communication networks. From the perspective of storage devices 120, storage interface bus 108 may be referred to as a host interface bus and provides a host data path between storage devices 120 and host systems 112, through storage controller 102 and/or an alternative interface to fabric network 114.

Host systems 112, or a respective host in a system having multiple hosts, may be any suitable computer device, such as a computer, a computer server, a laptop computer, a tablet device, a netbook, an internet kiosk, a personal digital assistant, a mobile phone, a smart phone, a gaming device, or any other computing device. Host systems 112 are sometimes called a host, client, or client system. In some embodiments, host systems 112 are server systems, such as a server system in a data center. In some embodiments, the one or more host systems 112 are one or more host devices distinct from a storage node housing the plurality of storage devices 120 and/or storage controller 102. In some embodiments, host systems 112 may include a plurality of host systems owned, operated, and/or hosting applications belonging to a plurality of entities and supporting one or more quality of service (QoS) standards for those entities and their applications. Host systems 112 may be configured to store and access data in the plurality of storage devices 120 in a multi-tenant configuration with shared storage resource pools, such as queue pairs 106.1.1-106.1.$n$ allocated and virtualized in a virtualization layer 106.1 in memory 106.

Storage controller 102 may include one or more central processing units (CPUs) or processors 104 for executing compute operations, storage management operations, and/or instructions for accessing storage devices 120 through storage interface bus 108. In some embodiments, processors 104 may include a plurality of processor cores which may be assigned or allocated to parallel processing tasks and/or processing threads for different storage operations and/or host storage connections. In some embodiments, processor 104 may be configured to execute fabric interface for communications through fabric network 114 and/or storage interface protocols for communication through storage interface bus 108 and/or control bus 110. In some embodiments, a separate network interface unit and/or storage interface unit (not shown) may provide the network interface protocol and/or storage interface protocol and related processor and memory resources.

Storage controller 102 may include a memory 106 configured to support a plurality of queue pairs 106.1.1-106.1.$n$ allocated between host systems 112 and storage devices 120 to manage command queues and storage queues for host storage operations against host data in storage devices 120. In some embodiments, storage controller 102 may be configured with virtualization layer 106.1 to enable dynamic control of queue-pair allocations by separating host connection requests and corresponding host connection identifiers from storage connection requests and corresponding storage queue identifiers. For example, virtualization layer 106.1 may be embodied in functions stored in memory 106 for execution by processor 104 to manage virtual mappings of host connection identifiers to one or more storage queue identifiers. In some embodiments, memory 106 may include one or more dynamic random access memory (DRAM) devices for use by storage devices 120 for command, management parameter, and/or host data storage and transfer. In some embodiments, storage devices 120 may be configured for direct memory access (DMA), such as using remote direct memory access (RDMA) protocols, over storage interface bus 108.

In some embodiments, data storage system 100 includes one or more processors, one or more types of memory, a display and/or other user interface components such as a keyboard, a touch screen display, a mouse, a track-pad, and/or any number of supplemental devices to add functionality. In some embodiments, data storage system 100 does not have a display and other user interface components.

Figure 2A:
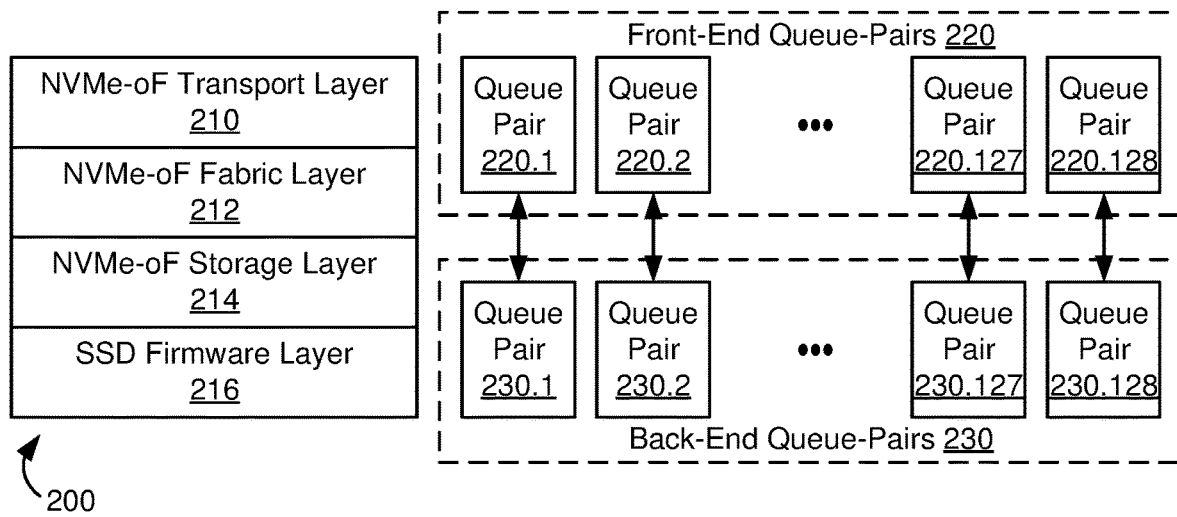
FIG. 2*a* schematically illustrates a prior art architecture for allocating queue-pairs on a one-to-one basis.
Figure 2B:
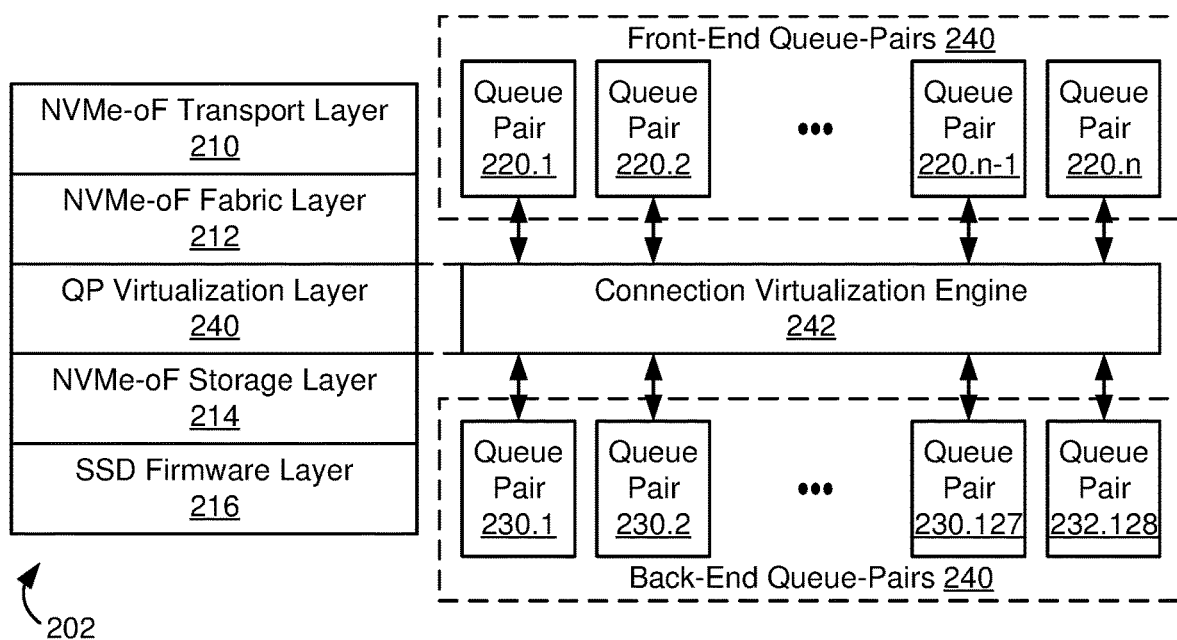
FIG. 2*b* schematically illustrates a connection virtualization architecture that may be used by storage nodes of the multi-device storage system of FIG. 1.

FIGS. 2a and 2b show schematic representations of two different NVMe-oF architectures 200, 202 for front-end host storage connections to back-end NVM storage device connections. FIG. 2a shows a prior art architecture that connects front-end queue-pairs 220 to back-end queue-pairs 230 on a one-to-one basis. FIG. 2b shows a novel architecture that connects front-end queue-pairs 220 to back-end queue-pairs 230 through a connection virtualization engine 242.

Architecture 200 includes a series of NVMe-oF input/output (I/O) layers 210, 212, 214, 216 traversed following the NVMe storage protocols on the target side (storage side of the fabric network, such as storage controller 102 and storage devices 120 in FIG. 1). For example, I/O storage commands from the hosts traverse the layers from top to bottom and responses from the storage devices traverse the layers from the bottom to the top. NVMe-oF transport layer 210 may be responsible for establishing end-to-end network communication across the fabric network for communication between the hosts and the storage devices. For example, NVMe-oF transport layer 210 may be implemented using various physical interfaces and network technologies, such as fiber channel (FC), RDMA, transport control protocol/internet protocol (TCP/IP), etc. NVMe-oF fabric layer 212 may be responsible for encapsulating commands and responses for transport across NVMe-oF transport layer 210. For example, the NVMe storage protocol defines command and response structures including command identifiers, namespace identifiers, command parameters, and other information. NVMe-oF storage layer 214 may be responsible for receiving host commands on the storage side, directing them to the target data storage device, such as a particular SSD in an all-flash-array, and handing off processing of the command to the storage device firmware (or SSD firmware layer 216). SSD firmware layer 216 may receive the storage command in a processing queue, such as one of back-end queue-pairs 230 and process the storage command in accordance with internal command handling logic and NVM device interface logic.

Architecture 200 assigns front-end queue-pairs 220 allocated by the hosts to back-end queue-pairs 230 maintained by the storage devices. For example, a unique host connection identifier corresponding to a specific namespace and host storage connection instance may be sent in a storage connection request and NVMe-oF storage layer 214 may select an unallocated back-end queue-pair from the storage devices to allocate to the host connection identifier, establishing a one-to-one relationship between host queue-pairs (command and completion queues) and storage device queue-pairs (command and storage queues). As a result, the number of front-end queue-pairs 220.1-220.128 may not exceed the pool of back-end queue-pairs 230.1-230.128, which are defined by the number of storage devices and the number of queue-pairs they are configured to support. In a multi-host environment, the number of back-end queue-pairs supported by the storage devices may be more likely to be a resource constraint then the number of hosts and host queue-pairs available to access the storage devices.

Architecture 202 adds queue-pair virtualization layer 240 between NVMe-oF fabric layer and NVMe-oF storage layer 214, embodied in connection virtualization engine 242. In some embodiments, connection virtualization engine 242 runs on a storage controller and intervenes in the allocation of back-end queue-pairs 230 and subsequent handling of storage commands. For example, connection virtualization engine 242 may receive host connection requests and may host connection identifiers to processing queues using its own assignment logic and connection mapping or logging. Connection virtualization engine 242 may then use the connection mapping to direct and monitor individual storage commands to rout them to storage devices with available processing resources and assure that their results are returned to the correct host completion queue.

Figure 3:
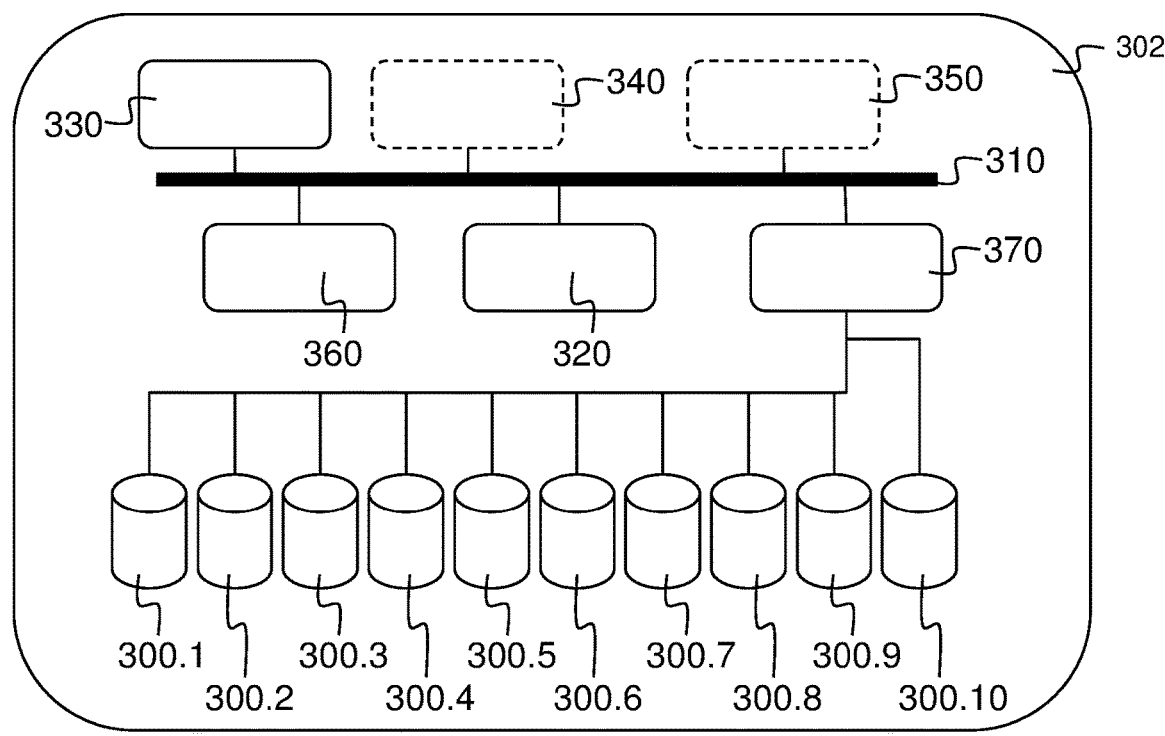
FIG. 3 schematically illustrates a storage node of the multi-device storage system of FIG. 1.

FIG. 3 shows a schematic representation of a storage node 302. For example, storage controller 102 may be configured as a storage node 302 for accessing storage devices 120 as storage elements 300. Storage node 302 may comprise a bus 310, a storage node processor 320, a storage node memory 330, one or more optional input units 340, one or more optional output units 350, a communication interface 360, a storage element interface 370 and a plurality of storage elements 300.1-300.10. In some embodiments, at least portions of bus 310, processor 320, local memory 330, communication interface 360, storage element interface 370 may comprise a storage controller, backplane management controller, network interface controller, or host bus interface controller, such as storage controller 102. Bus 310 may include one or more conductors that permit communication among the components of storage node 302. Processor 320 may include any type of conventional processor or microprocessor that interprets and executes instructions. Local memory 330 may include a random-access memory (RAM) or another type of dynamic storage device that stores information and instructions for execution by processor 320 and/or a read only memory (ROM) or another type of static storage device that stores static information and instructions for use by processor 320. Input unit 340 may include one or more conventional mechanisms that permit an operator to input information to said storage node 302, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables storage node 302 to communicate with other devices and/or systems, for example mechanisms for communicating with other storage nodes 302 or host systems 112. Storage element interface 370 may comprise a storage interface, such as a Serial Advanced Technology Attachment (SATA) interface, a Small Computer System Interface (SCSI), peripheral computer interface express (PCIe), etc., for connecting bus 310 to one or more storage elements 300, such as one or more storage devices 120, for example, 2 terabyte (TB) SATA-II disk drives or 2 TB NVMe solid state drives (SSDs), and control the reading and writing of data to/from these storage elements 300. As shown in FIG. 3, such a storage node 302 could comprise ten 2 TB SATA-II disk drives as storage elements 300.1-300.10 and in this way storage node 302 would provide a storage capacity of 20 TB to the storage system 100.

Storage elements 300 may be configured as redundant or operate independently of one another. In some configurations, if one particular storage element 300 fails its function can easily be taken on by another storage element 300 in the storage system. Furthermore, the independent operation of the storage elements 300 allows to use any suitable mix of types storage elements 300 to be used in a particular storage system 100. It is possible to use for example storage elements with differing storage capacity, storage elements of differing manufacturers, using different hardware technology such as for example conventional hard disks and solid-state storage elements, using different storage interfaces, and so on. All this results in specific advantages for scalability and flexibility of storage system 100 as it allows to add or remove storage elements 300 without imposing specific requirements to their design in correlation to other storage elements 300 already in use in that storage system 100.

Figure 4:
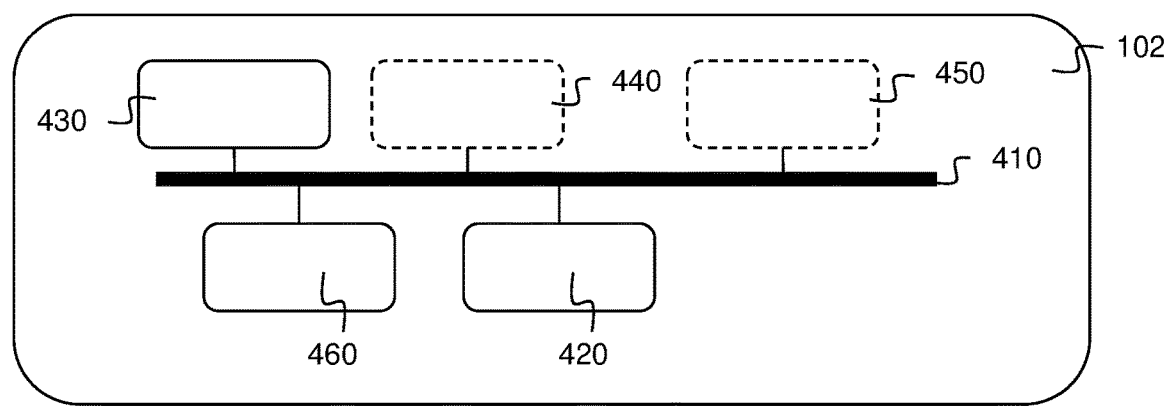
FIG. 4 schematically illustrates a host node of the multi-device storage system of FIG. 1.

FIG. 4 shows a schematic representation of an example host system 112. Host system 112 may comprise a bus 410, a processor 420, a local memory 430, one or more optional input units 440, one or more optional output units 450, and a communication interface 460. Bus 410 may include one or more conductors that permit communication among the components of host 112. Processor 420 may include any type of conventional processor or microprocessor that interprets and executes instructions. Local memory 430 may include a random access memory (RAM) or another type of dynamic storage device that stores information and instructions for execution by processor 420 and/or a read only memory (ROM) or another type of static storage device that stores static information and instructions for use by processor 420 and/or any suitable storage element such as a hard disc or a solid state storage element. An optional input unit 440 may include one or more conventional mechanisms that permit an operator to input information to host 112 such as a keyboard, a mouse, a pen, voice recognition and/or biometric mechanisms, etc. Optional output unit 450 may include one or more conventional mechanisms that output information to the operator, such as a display, a printer, a speaker, etc. Communication interface 460 may include any transceiver-like mechanism that enables host 112 to communicate with other devices and/or systems.

Figure 5:
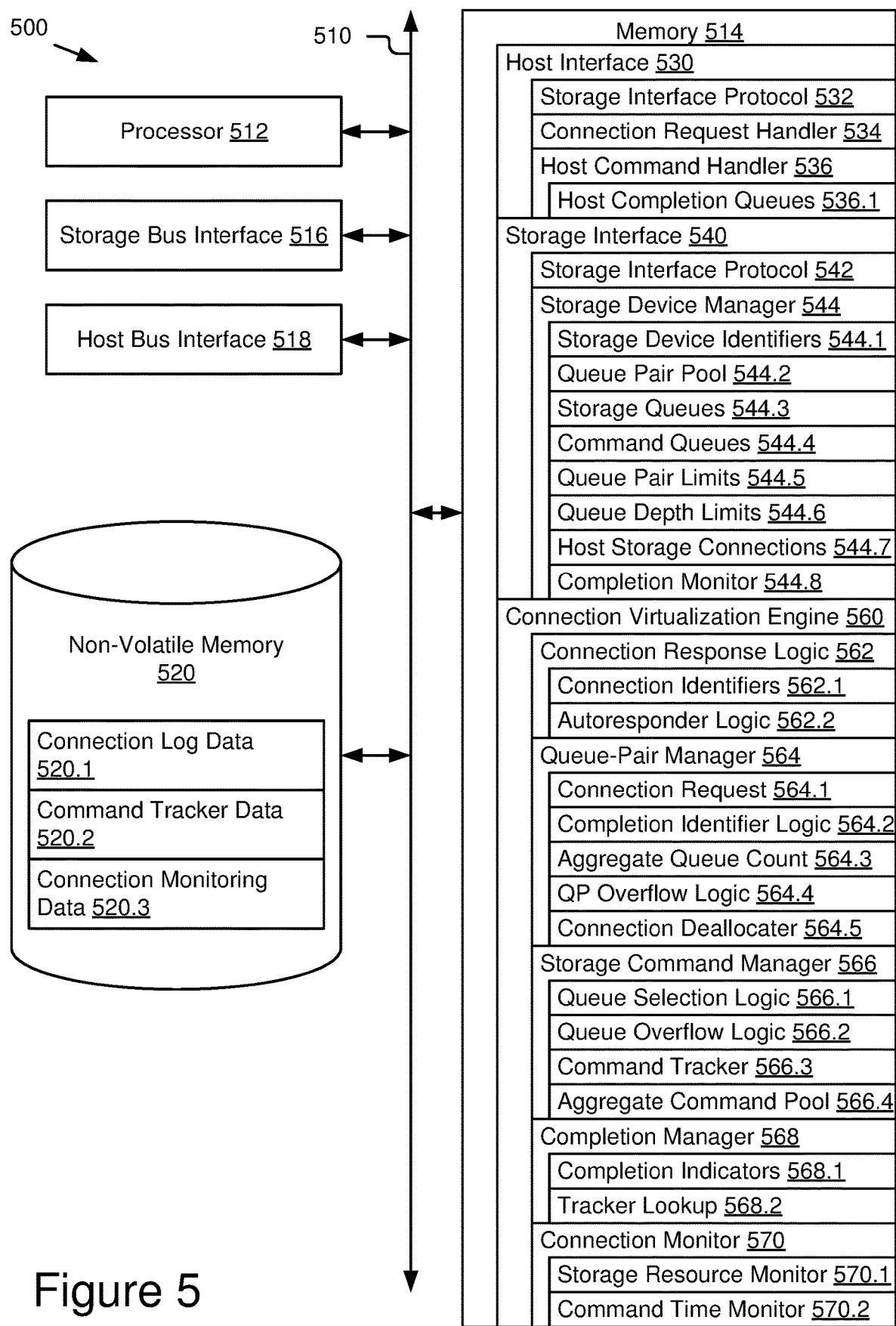
FIG. 5 schematically illustrates some elements of the storage node of FIG. 1-3 in more detail.

FIG. 5 schematically shows selected modules of a storage node 500 configured for connection virtualization. Storage node 500 may incorporate elements and configurations similar to those shown in FIGS. 1-3. For example, storage node 500 may be configured as storage controller 102 and a plurality of storage devices 120 supporting host connection requests and storage operations from host systems 112 over fabric network 114.

Storage node 500 may include a bus 510 interconnecting at least one processor 512, at least one memory 514, and at least one interface, such as storage bus interface 516 and host bus interface 518. Bus 510 may include one or more conductors that permit communication among the components of storage node 500. Processor 512 may include any type of processor or microprocessor that interprets and executes instructions or operations. Memory 514 may include a random access memory (RAM) or another type of dynamic storage device that stores information and instructions for execution by processor 512 and/or a read only memory (ROM) or another type of static storage device that stores static information and instructions for use by processor 512 and/or any suitable storage element such as a hard disk or a solid state storage element.

Storage bus interface 516 may include a physical interface for connecting to one or more data storage devices using an interface protocol that supports storage device access. For example, storage bus interface 516 may include a PCIe or similar storage interface connector supporting NVMe access to solid state media comprising non-volatile memory devices 520. Host bus interface 518 may include a physical interface for connecting to a one or more host nodes, generally via a network interface. For example, host bus interface 518 may include an ethernet connection to a host bus adapter, network interface, or similar network interface connector supporting NVMe host connection protocols, such as RDMA and TCP/IP connections. In some embodiments, host bus interface 518 may support NVMeoF or similar storage interface protocols.

Storage node 500 may include one or more non-volatile memory devices 520 or similar storage elements configured to store host data. For example, non-volatile memory devices 520 may include a plurality of SSDs or flash memory packages organized as an addressable memory array. In some embodiments, non-volatile memory devices 520 may include NAND or NOR flash memory devices comprised of single level cells (SLC), multiple level cell (MLC), triple-level cells, quad-level cells, etc.

Storage node 500 may include a plurality of modules or subsystems that are stored and/or instantiated in memory 514 for execution by processor 512 as instructions or operations. For example, memory 514 may include a host interface 530 configured to receive, process, and respond to host connection and data requests from client or host systems. Memory 514 may include a storage interface 540 configured to manage read and write operations to non-volatile memory devices 520. Memory 514 may include a connection virtualization engine 560 configured provide the connection virtualization layer between the processing queues and corresponding identifiers of host devices and storage devices.

Host interface 530 may include an interface protocol and/or set of functions and parameters for receiving, parsing, responding to, and otherwise managing requests from host nodes or systems. For example, host interface 530 may include functions for receiving and processing host requests for establishing host connections with one or more volumes or namespaces stored in storage devices for reading, writing, modifying, or otherwise manipulating data blocks and their respective client or host data and/or metadata in accordance with host communication and storage protocols. In some embodiments, host interface 530 may enable direct memory access and/or access over NVMe protocols, such as RDMA and TCP/IP access, through host bus interface 518 and storage bus interface 518 to host data units 520.1 stored in non-volatile memory devices 520. For example, host interface 530 may include host communication protocols compatible with ethernet and/or another host interface that supports use of NVMe and/or RDMA protocols for data access to host data 520.1. Host interface 530 may further include host communication protocols compatible with accessing storage node and/or host node resources, such memory buffers, processor cores, queue pairs, and/or specialized assistance for computational tasks.

In some embodiments, host interface 530 may include a plurality of hardware and/or software modules configured to use processor 512 and memory 514 to handle or manage defined operations of host interface 530. For example, host interface 530 may include a storage interface protocol 532 configured to comply with the physical, transport, and storage application protocols supported by the host for communication over host bus interface 518 and/or storage bus interface 516. For example, host interface 530 may include a connection request handler 534 configured to receive and respond to host connection requests. For example, host interface 530 may include a host command handler 536 configured to receive host storage commands to a particular host connection. In some embodiments, host interface 530 may include additional modules (not shown) for command handling, buffer management, storage device management and reporting, and other host-side functions.

In some embodiments, storage interface protocol 532 may include both PCIe and NVMe compliant communication, command, and syntax functions, procedures, and data structures. In some embodiments, storage interface protocol 532 may include an NVMeoF or similar protocol supporting RDMA, TCP/IP, and/or other connections for communication between host nodes and target host data in non-volatile memory 520, such as volumes or namespaces mapped to the particular host. Storage interface protocol 532 may include interface definitions for receiving host connection requests and storage commands from the fabric network, as well as for providing responses to those requests and commands. In some embodiments, storage interface protocol 532 may assure that host interface 530 is compliant with host request, command, and response syntax while the backend of host interface 530 may be configured to interface with connection virtualization engine 560 to provide indirection between the host requests and the storage devices.

Connection request handler 534 may include interfaces, functions, parameters, and/or data structures for receiving host connection requests in accordance with storage interface protocol 532, determining an available processing queue, such as a queue-pair, allocating the host connection (and corresponding host connection identifier) to a storage device processing queue, and providing a response to the host, such as confirmation of the host storage connection or an error reporting that no processing queues are available. For example, connection request handler 534 may receive a storage connection request for a target namespace in a NVMe-oF storage array and provide an appropriate namespace storage connection and host response. To enable connection virtualization engine 560, connection request handler 534 may validate the incoming host connection request and then pass processing of the connection request to connection virtualization engine 560. Connection request handler 534 may then receive a response from connection virtualization engine 560 to provide back to the requesting host. In some embodiments, data describing each host connection request and/or resulting host connection may be stored in host connection log data 520.1. For example, connection request handler 534 may generate entries in a connection log table or similar data structure indexed by host connection identifiers and including corresponding namespace and other information.

In some embodiments, host command handler 536 may include interfaces, functions, parameters, and/or data structures to provide a function similar to connection request handler 534 for storage requests directed to the host storage connections allocated through connection request handler 534. For example, once a host storage connection for a given namespace and host connection identifier is allocated to a back-end queue-pair, the host may send any number of storage commands targeting data stored in that namespace.

To enable connection virtualization engine 560, host command handler 536 may validate the incoming storage commands and then pass forwarding the storage command to the processing queue to connection virtualization engine 560. Host command handler 536 may also maintain return paths for responses from the storage commands, such as corresponding front-end queue-pairs for providing responses back to the correct host. For example, host command handler 536 may include host completion queues 538 configured to receive storage device responses to the host storage commands. In some embodiments, host completion queues 536.1 and corresponding response addressing may be maintained by host command handler 536 using host connection identifiers and connection log data 520.1. For example, connection virtualization engine 560 may return response messages with corresponding host connection identifiers for use by host command handler 536 in reaching the correct host completion queues 536.1.

Storage interface 540 may include an interface protocol and/or set of functions and parameters for reading, writing, and deleting data units in corresponding storage devices. For example, storage interface 540 may include functions for executing host data operations related to host storage commands received through host interface 530 once a host connection is established. For example, PUT or write commands may be configured to write host data units to non-volatile memory devices 520. GET or read commands may be configured to read data from non-volatile memory devices 520. DELETE commands may be configured to delete data from non-volatile memory devices 520, or at least mark a data location for deletion until a future garbage collection or similar operation actually deletes the data or reallocates the physical storage location to another purpose. Similar to host interface 530, storage interface 540 may include a storage interface protocol In some embodiments, storage interface 540 may include a plurality of hardware and/or software modules configured to use processor 512 and memory 514 to handle or manage defined operations of storage interface 540. For example, storage interface 540 may include a storage interface protocol 542 configured to comply with the physical, transport, and storage application protocols supported by the storage devices for communication over storage bus interface 516, similar to or part of storage interface protocol 532. For example, storage interface 540 may include a storage device manager 544 configured to manage communications with the storage devices in compliance with storage interface protocol 542.

Storage device manager 544 may include interfaces, functions, parameters, and/or data structures to manage how host storage commands are sent to corresponding processing queues in the storage devices and responses are returned for the hosts. In some embodiments, storage device manager 544 may manage a plurality of storage devices, such as an array of storage devices in a storage node. For example, storage device manager 544 may be configured for a storage array of eight SSDs, each SSD having a unique storage device identifier and configuration. In some embodiments, storage device manager 544 may include a data structure containing storage device identifiers 544.1 and configuration information for each storage device, such as port and/or other addressing information, device type, capacity, number of supported queue-pairs, I/O queue depth, etc.

In some embodiments, storage device manager 544 may be configured to determine a queue-pair pool 544.2 across all corresponding storage devices that it manages. For example, queue-pair pool 544.2 may equal a total number of concurrent queue-pairs supported across all corresponding storage devices in storage node 500. Queue-pair pool 544.2 may include a set of parameters describing the maximum number, size, and/or other parameters for available queue pairs stored in a data structure. In some embodiments, storage device manager 544 may monitor the allocation of memory space and data structures for storage queues 544.3 and command queues 544.4 that receive host storage commands and buffer host data for transfer to or from data storage devices. Storage queues 544.3 and command queues 544.4 may be managed as storage processing queues and/or queue-pairs. The corresponding storage queues and command queues of the storage devices may be configured to aggregate storage operations and host commands for one or more host connections. For example, storage queues 544.3 may include each active storage queue that is assigned at least one host connection that corresponds to host data transfers between storage node 500 and a respective host node. Command queues 544.4 may include each active command queue that is assigned to at least one host connection that corresponds to host commands received from the respective host node that have not yet been resolved by storage node 500. In some embodiments, each storage device may be configured with a queue-pair limit 544.5, reflecting the maximum number of concurrent host/namespace connections the storage device can support. In some embodiments, each storage device may be configured with a queue-depth limit 544.6, reflecting the maximum number of pending storage commands they can support in each command queue before returning a queue full error. In some embodiments, queue-pair limits 544.5 and queue-depth limits 544.6 may be used to calculate connection and command resources for queue-pair pool 544.2.

In some embodiments, storage device manager 544 may be configured to manage host storage connections 544.7 from the perspective of the storage devices. For example, storage device manager 544 may determine which host storage connections are allocated to which storage devices and processing queues. To enable connection virtualization engine 560, storage device manager 544 may be configured to receive host storage connections 544.7 from connection virtualization engine 560 (directly or in conjunction with connection request handler 534). Similarly, storage device manager 544 may be configured to forward storage commands from connection virtualization engine 560 to target processing queues of target storage devices. In some embodiments, storage device manager 544 may include a completion monitor 544.8 configured to monitor the storage devices for responses to storage commands sent to them. For example, each storage device may be configured to send the results of storage commands (such as completion notifications or return data) to storage device manager 544 and completion monitor 544.8 may match responses to pending command identifiers. To enable connection virtualization engine 560, storage device manager 544 may forward responses received by completion monitor 544.8 to connection virtualization engine 560.

Connection virtualization engine 560 may include interface protocols and a set of functions and parameters for providing a virtualization layer between host interface 530 and storage interface 540. For example, connection virtualization engine 560 may receive and resolve host connection requests and related storage commands by providing indirection and mapping between front-end queue-pairs and back-end queue-pairs. Connection virtualization engine 560 may include hardware and/or software modules configured to use processor 512 and memory 514 for executing specific functions of connection virtualization engine 560. In some embodiments, connection virtualization engine 560 may include connection response logic 562, queue-pair manager 564, storage command manager 566, completion manager 568, and connection monitor 570.

Connection response logic 562 may include interfaces, functions, parameters, and/or data structures configured to determine a response to host connection requests in support of connection request handler 534. In some embodiments, connection response logic 562 may be called by or integrated with connection request handler 534. Connection response logic 562 may identify or determine a host connection identifier 562.1 for managing unique host connections to namespaces in the storage devices. For example, connection response logic 562 may extract host connection identifier 562.1 from the host connection request and/or receive host connection identifier 562.1 from connection request handler 534 and/or connection log data 520.1. In some embodiments, connection response logic 562 may include autoresponder logic 562.2 configured to override normal queue-pair limits and aggregate host connection counts. For example, autoresponder logic 562.2 may automatically respond through connection request handler 534 that host storage connections are available, even if the number of active host storage connections exceeds the aggregate queue-pair pool 544.2. In some embodiments, autoresponder logic 562.2 may accept all host connection requests without regard to the number of active host connection requests, treating the maximum number of host storage connections as infinite and relying on the aggregate command pool to manage resource overflows, should they occur. In some embodiments, host connection identifiers 562.1 may then be passed to queue-pair manager 564 for further processing of host connection requests.

Queue-pair manager 564 may include interfaces, functions, parameters, and/or data structures configured to manage allocations of host or front-end queue-pairs represented by host connection identifiers 562.1 to storage device or back-end queue-pairs represented by completion connection identifiers. In some embodiments, queue-pair manager 564 may receive or identify each connection request 564.1 received from the hosts. For example, queue-pair manager 564 may receive connection requests 564.1 from connection request handler 534, connection response logic 562, and/or connection log data 520.1.

For each connection request 564.1, queue-pair manage may invoke completion identifier logic 564.2 to assign a default host storage connection between the host connection identifier and a completion connection identifier for a target processing queue, such as a target queue-pair of a target storage device. For example, completion identifier logic 564.2 may be configured to generate and assign completion connection identifiers to target processing queues for use in allocating and managing back-end queue-pairs without relying on host connection identifiers. In some embodiments, queue-pair manager 564 may include or access storage device identifiers 544.1 and processing queue identifiers (e.g., queue-pair identifiers) that uniquely identify a specific storage device and processing queue of that storage device for assigning and storing completion connection identifiers.

In some embodiments, completion identifier logic 564.2 may initially allocate host connection identifiers to new or unallocated processing queues of queue-pair pool 544.2 until an aggregate queue-count 564.3 exceeds the aggregate queue-pair limit of queue-pair pool 544.2. For example, 8 storage devices may each support 16 queue-pairs, resulting in an aggregate queue-pair limit for the storage node of 128 host storage connections. For the first 128 host connection requests, completion identifier logic 564.2 may select processing queues and corresponding completion connection identifiers on a one-to-one basis, where each host connection identifier is uniquely assigned to a default queue-pair. Once the queue-pair limit is exceeded by aggregate queue count 564.3, rather than rejecting new host connection requests, completion identifier logic 564.2 may be configured to allocate new host connection identifiers to default processing queues that are already allocated to another host connection identifier, resulting in host connection identifiers being allocated to completion connection identifiers on a many-to-one basis. That is, each completion connection identifier may be associated with more than one host connection identifier by default. As a result, over the queue-pair limit, some portion of the host storage connections may be on a one-to-one basis and some portion of host storage connections may be on a multiple-to-one or many-to-on basis.

In some embodiments, queue-pair manager 564 may include queue-pair overflow logic 564.4 to determine how redundant completion connection identifiers are allocated to new host connection requests. For example, queue-pair overflow logic 564.4 could be based on simple round-robin, random, or similar selection logic for distributing the multiple connections. In some embodiments, completion connection identifiers may be placed in a priority order for additional host storage connections based on I/O usage, capacity, load balancing, wear, reliability (e.g., error rates, etc.), and/or other storage device or operational parameters. For example, queue-pair overflow logic 564.4 may evaluate the queue-depths of the pending storage commands in each processing queue and assign the new connection to the processing queue with the lowest pending storage command count. In some embodiments, queue-pair manager 564 may store the default completion connection identifier in connection log data 520.1 for use in managing future storage commands addressed to that host connection identifier.

In some embodiments, queue-pair manager 564 may include a connection deallocator 564.5 configured to deallocate host storage connections and corresponding host connection identifiers that are not actively being used by the host. For example, connection deallocator 564.5 may include a connection timeout parameter that it uses to evaluate the recency of storage commands to each host connection identifier. Responsive to an elapsed time since the last storage command to that host connection identifier meeting the connection timeout parameter, the host connection identifier may be deallocated from any default completion connection identifier previously associated with that host connection identifier. This may enable queue-pair manager 564 to reclaim and reuse processing queues for mapping default host storage connections. In some embodiments, the host may be notified of the terminated or timed-out host storage connection. In some embodiments, deallocated but not terminated host connection identifiers may be maintained in connection log data 520.1 and processed by queue-pair manager 564 as a new connection request in the event that a new storage command is received for the deallocated host connection identifier. In some embodiments, storage commands to deallocated but not terminated host storage connections may be passed to storage command manager 566, automatically treated as responding to a queue full error, and processed using queue overflow logic 566.2.

Storage command manager 566 may include interfaces, functions, parameters, and/or data structures configured to manage allocation of individual storage commands to the processing queues and their respective completion connection identifiers. For example, host command handler 536 may forward storage commands to storage command manager 566 to enable virtualization and dynamic allocation of storage commands to processing queues other than the default completion connection identifier assigned by queue-pair manager 564. In some embodiments, queue selection logic 566.1 may include logical rules for selecting the processing queue to which the incoming storage command is allocated. For example, queue selection logic 566.1 may initially allocate storage commands to the default completion connection identifier and corresponding processing queue unless and until a queue full notification is received from that processing queue. Responsive to the queue full notification, queue selection logic 566.1 may initiate queue overflow logic 566.2 to evaluate other available processing queues that could receive and process the storage command. For example, queue overflow logic 566.2 may evaluate other processing queues to the same storage device, determine which has the shortest queue depth of pending storage commands, and select that processing queue. In another example, queue overflow logic 566.2 may evaluate all available processing queues across all storage devices. In still another example, queue overflow logic 566.2 may initiate queue-pair manager 564 to initiate a new processing queue and corresponding completion identifier to receive the storage command. Any of these actions may enable the storage command to be processed and prevent or interrupt the return of a queue full error to the host system. In some embodiments, selection of processing queues for overflow storage commands may be based on a priority order among processing queues based on I/O usage, capacity, load balancing, wear, reliability (e.g., error rates, etc.), and/or other storage device or operational parameters. For example, processing queues may be prioritized or otherwise selected based on storage resource usage values from storage resource monitor 570.1. In some embodiments, queue selection logic 566.1 may be configured to evaluate processing queue priorities for incoming storage commands without first determining the default processing queue is full. In some embodiments, once a queue full notification is received, queue selection logic 566.1 may default to queue overflow logic 566.2 for a set period of time, number of storage commands, or other criteria to allow the full processing queue to reduce its queue depth before attempting to allocate another storage command to it.

Once storage command manager 566 determines the processing queue and corresponding completion connection identifier for an incoming storage command, mapping of the storage command to host connection identifier and completion connection identifier may be stored by command tracker 566.3. For example, command tracker 566.3 may store a storage command entry in command tracker data 520.2. In some embodiments, command tracker 566.3 may store command tracker entries in a data structure in command tracker data 520.2. For example, each entry may include a storage command identifier, a storage command type, a host connection identifier, and a completion connection identifier. In some embodiments, command tracker 566.3 may generate an initial entry for the default connection completion identifier and, responsive to queue overflow logic 566.2, update the command tracker entry to include an updated connection completion identifier for the newly allocated processing queue. In some embodiments, storage command manager 566 may also determine a count of active or pending storage commands in aggregate command pool 566.4 to evaluate when all processing queues are reaching their queue depth limits and the total processing capacity of the storage devices may be nearing an overflow state. For example, storage command manager 566 may include aggregate command pool threshold value and, when that threshold value is met, return queue full errors to the hosts. In an example storage node with 8 storage devices, each having 16 queue-pairs, for 128 total queue pairs, where each queue pair has a queue depth limit of 16, the maximum aggregate command pool would be 2,048 pending storage commands. A command pool threshold value may be set at the maximum aggregate command pool value or some percentage or offset therefrom. For example, storage command manager 566 could start rejecting storage commands at 90% capacity or 110% capacity (where the unallocated storage commands are held in first-in-first-out queue in storage command manager 566 until a processing queue opens up).

Completion manager 568 may include interfaces, functions, parameters, and/or data structures configured to manage handling the indirection of completion notifications from the storage devices to the corresponding hosts. For example, completion manager 568 may receive, through completion monitor 544.8, storage device completion indicators 568.1 for storage commands that have been processed and forward those completion indicators 568.1 to the corresponding host completion queue through host command handler 536. In some embodiments, each storage device may return completion indicators 568.1 to completion monitor 544.8 and, rather than forwarding the completion indicator 568.1 to host command handler 536, completion monitor 544.8 may initiate completion manager 568 in order to determine which host completion queue 536.1 the completion indicator 568.1 should go to. In some embodiments, completion manager 568 may determine the return path for the storage command using tracker lookup 568.2. For example, tracker lookup 568.2 may use the storage command identifier as an index to find the tracker entry for the storage command in command tracker data 520.2. The tracker entry may include the host connection identifier from which the storage command was received which, in turn, determines the host completion queue for returning the completion indicator to the correct host through the correct host queue pair. In some embodiments, completion manager 568 may be configured to replace the completion connection identifier with the host connection identifier in the message parameters for routing the completion indicator to the corresponding host completion queue.

Connection monitor 570 may include interfaces, functions, parameters, and/or data structures configured to monitor host storage connections to the storage devices to evaluate connection usage and available storage device resources. For example, connection monitor 570 may log host storage connections and storage commands allocated to each storage device processing queue to maintain operational data across all processing queues in connection monitoring data 520.3. In some embodiments, connection monitor 570 may include a storage resource monitor 570.1 configured to aggregate processing queue usage data and/or other data related to storage device resources for processing host storage commands. For example, storage resource monitor 570.1 may maintain a log or similar data structure in connection monitoring data 520.3 for storing and updating a real-time count of active or pending storage commands allocated to each processing queue or queue-pair. Pending storage command counts may be used by storage command manager 566 to determine queue selection, queue overflow, and/or loading of the aggregate command pool. In some embodiments, connection monitor 570 may include a command time monitor 570.2 for tracking elapsed time since a last storage command was sent to a particular processing queue. For example, command time monitor 570.2 may log timestamps related to each storage command sent to a processing queue and track the elapsed time from the last storage command activity for use by connection deallocator 564.5 and/or storage command manager 566.

Figure 6A:
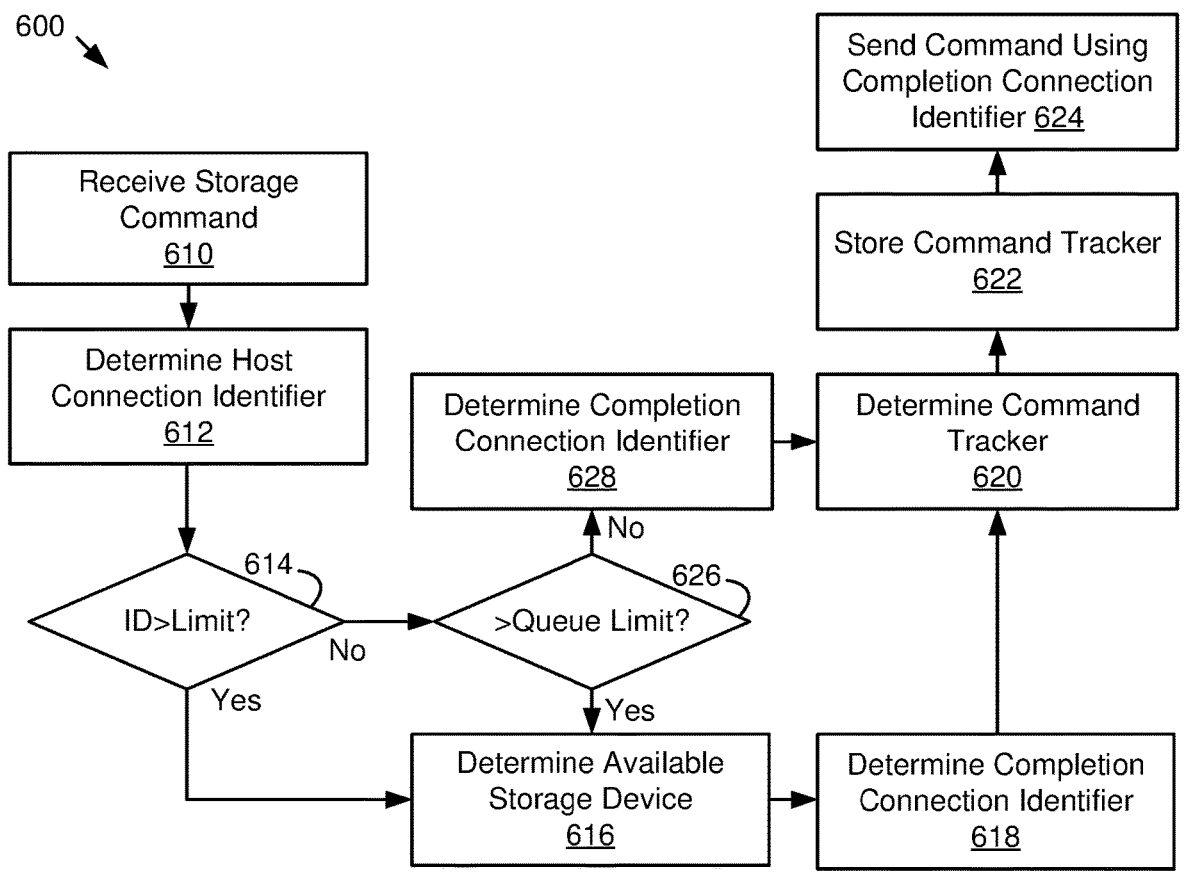
FIG. 6*a* is a flowchart of an example method of receiving and allocating storage commands through a connection virtualization layer.

As shown in FIG. 6a, storage node 500 may be operated according to an example method for receiving and allocating storage commands through a connection virtualization layer, i.e., according to method 600 illustrated by blocks 610-628 in FIG. 6a.

At block 610, a storage command may be received from a host system. For example, the storage node may receive a host storage command directed to a previously allocated host connection identifier.

At block 612, a host connection identifier may be identified. For example, the storage command message may include a host connection identifier among its parameters and passed to a connection virtualization engine.

At block 614, whether the host connection identifier exceeds the nominal queue pair limit of the storage node may be determined. For example, the storage node may assign each host connection identifier a count in connection log data to track the total number of host connections and identify host connections in excess of the number of unique processing queues or queue-pairs supported by the storage devices. If the host connection identifier is greater than the queue pair limit, method 600 may proceed to block 616. If the host connection identifier is not greater than the queue pair limit, method 600 may proceed to block 626.

At block 616, an available storage device may be determined. For example, the connection virtualization engine may include selection logic for determining a storage device with an available processing queue.

At block 618, a completion connection identifier may be determined. For example, the connection virtualization engine may assign completion connection identifiers to each processing queue supported by the storage devices and determine the completion connection identifier for the selected storage device processing queue.

At block 620, a command tracker may be determined for the storage command. For example, the connection virtualization engine may generate a command tracker entry including the storage command identifier, host connection identifier, and completion connection identifier.

At block 622, the command tracker may be stored. For example, the connection virtualization engine may store the command tracker entry in command tracker data in the storage node.

At block 624, the storage command may be sent to the storage device using the completion connection identifier. For example, the connection virtualization engine may send the storage command message to the target processing queue of the target storage device using the completion connection identifier for addressing or accessing addressing information.

At block 626, whether the default host storage connection is over the queue limit may be evaluated. For example, the connection virtualization engine may check the queue depth of the default processing queue, such as based on a queue full status from a connection monitor or receipt of a queue full error message (or similar queue full notification) from the default processing queue. If the target processing queue is not over the queue limit, method 600 may proceed to block 628 to process the storage command using the default processing queue. If the target processing queue is over the queue limit, method 600 may proceed to block 616 to select a new storage device and/or processing queue as described above.

At block 628, a completion connection identifier may be determined. For example, the connection virtualization engine may use the completion connection identifiers corresponding to the default processing queue and proceed to block 620.

Figure 6B:
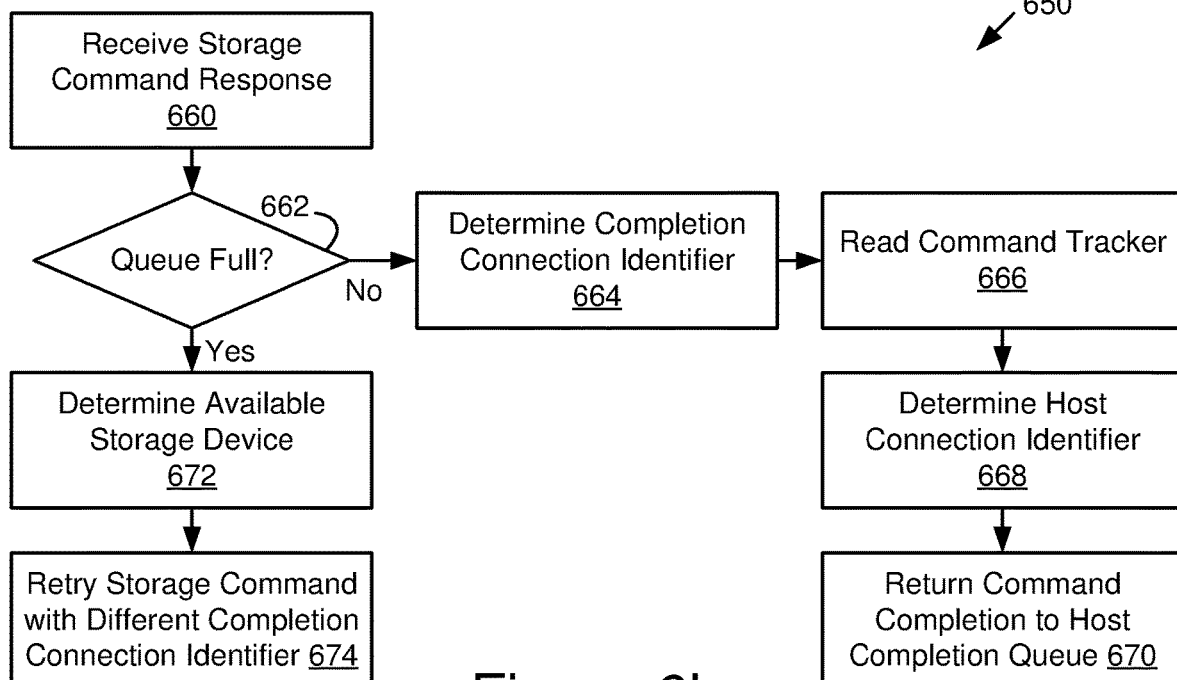
FIG. 6*b* is a flowchart of an example method of receiving and returning command completion through a connection virtualization layer.

As shown in FIG. 6b, storage node 500 may be operated according to an example method for receiving and returning command completion through a connection virtualization layer, i.e., according to method 650 illustrated by blocks 660-674 in FIG. 6b.

At block 660, a storage command response may be received from a storage device. For example, the connection virtualization engine may receive a completion indicator, error message, or other response from a storage device indicating the storage command identifier and disposition of the storage command.

At block 662, whether the storage command response is a queue full error may be determined. For example, the connection virtualization engine may parse the response message to determine whether it include a queue full error code, message, or other parameter. If no, method 650 may proceed to block 664. If yes, method 650 may proceed to block 672 for queue full error handling.

At block 664, a completion connection identifier may be determined from the storage command response. For example, the completion connection identifier provided by the connection virtualization engine in the storage command sent to the storage device may be returned as a parameter of the response message.

At block 666, a command tracker entry for the storage command may be read. For example, the connection virtualization engine may determine the corresponding command tracker entry for the storage command identifier.

At block 668, a host connection identifier may be determined. For example, the command tracker entry for the storage command identifier may include the host connection identifier for the host storage connection that was the source of the storage command.

At block 670, the storage command completion indicator may be returned to the corresponding host completion queue. For example, the connection virtualization engine may replace the completion connection identifier with the host connection identifier in the completion indicator message and forward it to the host system.

At block 672, an available storage device and corresponding processing queue may be determined. For example, the connection virtualization engine may include logic for handling queue full errors and selecting another processing queue from the same or another storage device.

At block 674, the storage command may be retried with a different completion connection indicator. For example, the connection virtualization engine may select a different processing queue and corresponding completion connection indicator, then proceed with forwarding the storage command for another attempt at processing, such as according to blocks 618-624 of method 600.

Figure 7:
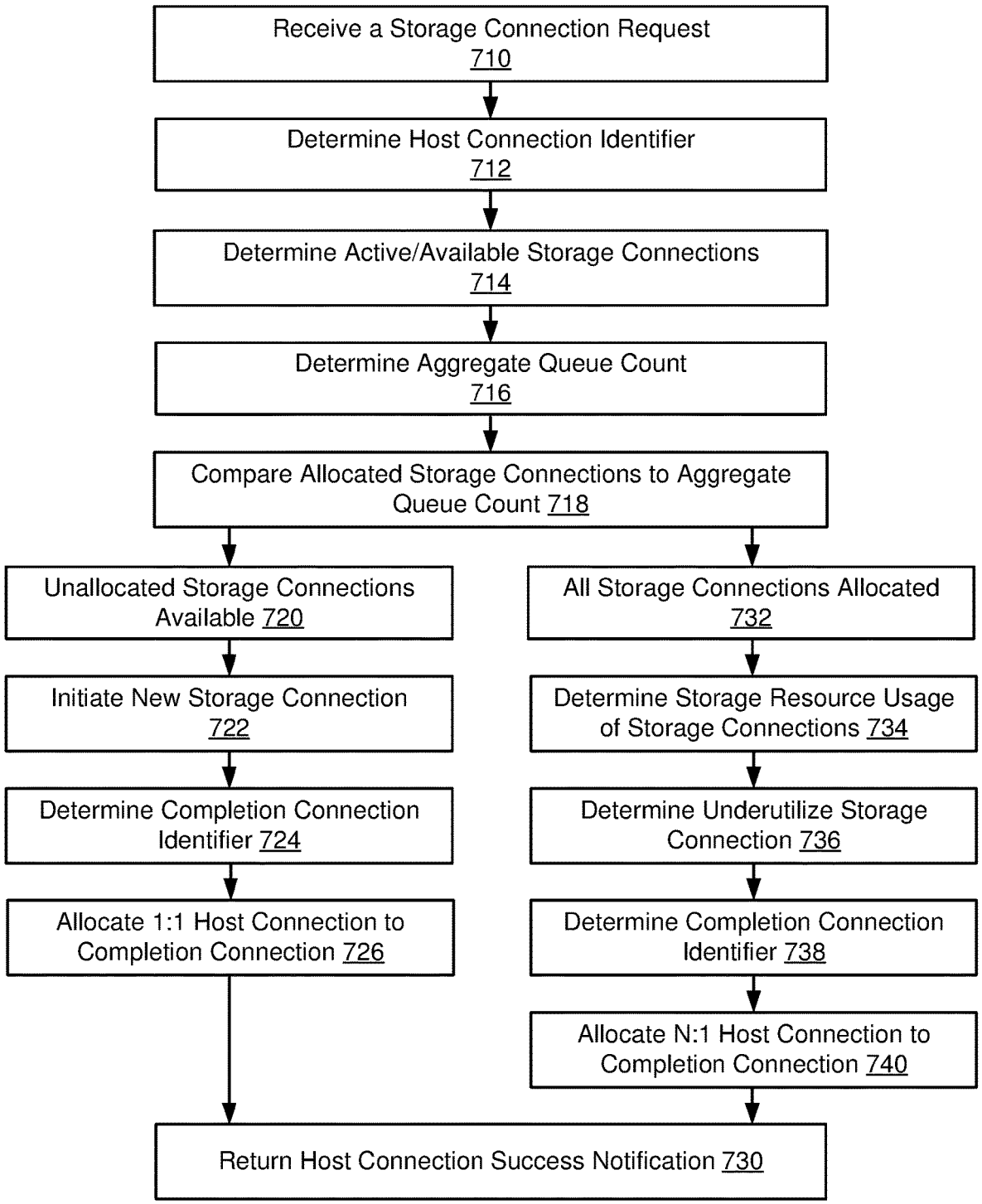
FIG. 7 is a flowchart of an example method of establishing host storage connections through a connection virtualization layer.

As shown in FIG. 7, storage node 500 may be operated according to an example method for establishing host storage connections through a connection virtualization layer, i.e., according to method 700 illustrated by blocks 710-740 in FIG. 7.

At block 710, a storage connection request may be received from a host system. For example, the storage node may be configured to receive host connection requests in accordance with an NVMe storage protocol and targeting a target namespace in the storage devices of the storage node.

At block 712, a host connection identifier may be determined. For example, a connection virtualization engine may extract, from the host storage connection request, the host connection identifier assigned to the storage connection request by the host system.

At block 714, active and/or available storage connections may be determined. For example, the connection virtualization engine may monitor the count of active host connection identifiers and corresponding host storage connections and/or the corresponding number of unused or available storage device connections (e.g., processing queues or queue-pairs) that have not yet been allocated.

At block 716, an aggregate queue count may be determined. For example, the connection virtualization engine may be configured with or calculate from storage device parameters the maximum number of processing queues that can be allocated across all storage devices.

At block 718, allocated host storage connections may be compared to aggregate queue count. For example, the connection virtualization engine may determine whether the previously (or currently) allocated host connection identifiers exceed the aggregate queue count, meaning that all processing queues on the storage device side have been allocated as default completion connections to at least one host storage connection and corresponding host connection identifier.

At block 720, unallocated storage connections are available. For example, the connection virtualization engine may have determined at block 718 that not all processing queues have been allocated.

At block 722, a new host storage connection may be initiated with an unallocated processing queue of a storage device. For example, the connection virtualization engine may select a previously unused back-end queue-pair to use as the default completion connection for the storage connection request and corresponding host connection identifier.

At block 724, a completion connection identifier may be determined. For example, the connection virtualization engine may identify or assign a completion connection identifier to the target processing queue.

At block 726, host connections may be allocated to completion connections on a 1:1 basis. For example, as long as there are enough available processing queues, the connection virtualization engine may assign default completion connection identifiers to each host connection identifier in a host connection log.

At block 730, a host connection success notification may be returned to the host system. For example, the connection virtualization engine may enable the storage node return a host connection success notification regardless of how many prior host storage connections have been established with the storage node.

At block 732, all back-end storage connections may be allocated. For example, the connection virtualization engine may have previously allocated all processing queues and corresponding completion connection identifiers as default host storage connections for at least one host connection identifier.

At block 734, storage resource usage for storage connections may be determined. For example, the connection virtualization engine may monitor the processing queues for current queue depth of pending storage commands or other operating parameters.

At block 736, underutilized storage connections may be determined. For example, the connection virtualization engine may evaluate the queue depths and select a processing queue with the lowest count of pending storage commands as the default processing queue for the new storage connection request.

At block 738, the completion connection identifier for the selected processing queue may be determined. For example, the connection virtualization engine may identify the completion queue identifier corresponding to the selected processing queue.

At block 740, host connections may be allocated to completion connections on an n:1 basis, where n may be 1 or higher. For example, because all available processing queues have been allocated as a default host storage connection for at least one host connection identifier, the connection virtualization engine may assign default completion connection identifiers that are already assigned to another host connection identifier in a host connection log, resulting in a subset or portion of the default host storage connections being of many-to-one connections. Method 700 may still proceed to block 730 to notify the host of a successful connection.

Figure 8:
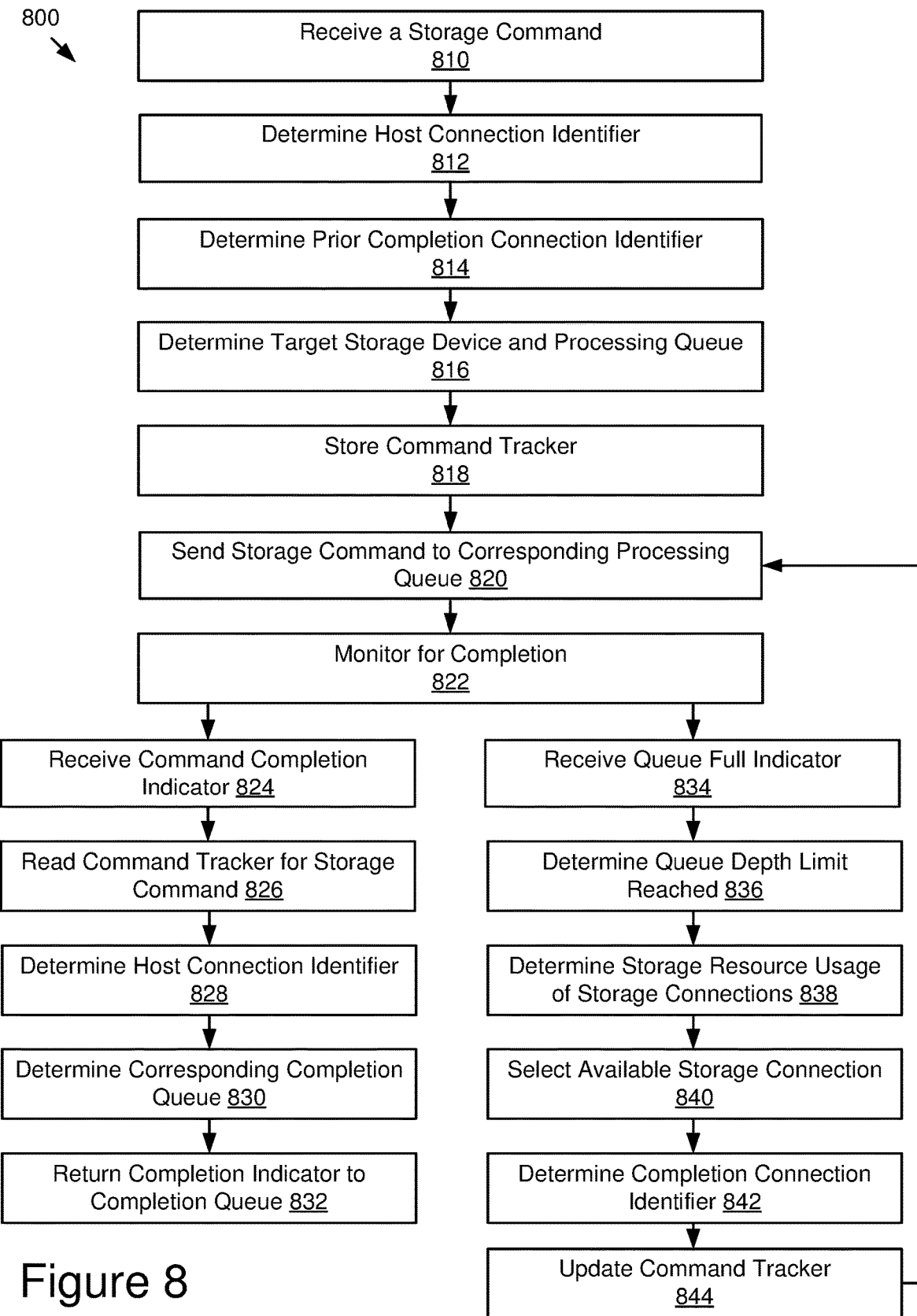
FIG. 8 is a flowchart of an example method of managing storage commands through a connection virtualization layer.

As shown in FIG. 8, storage node 500 may be operated according to an example method for managing storage commands through a connection virtualization layer, i.e., according to method 800 illustrated by blocks 810-844 in FIG. 8.

At block 810, a storage command may be received from a host system. For example, the storage node may receive a host storage command directed to a host storage connection using a host connection identifier.

At block 812, a host connection identifier may be determined. For example, a connection virtualization engine may identify the host connection identifier from the parameters of the storage command message.

At block 814, a default or prior completion connection identifier may be determined. For example, the connection virtualization engine may determine a default completion connection identifier for a host storage connection from the host connection log.

At block 816, a target storage device and processing queue may be determined. For example, the completion connection identifier may correspond to a storage device identifier and a processing queue identifier that uniquely identify the target storage device and target processing queue of that storage device.

At block 818, a command tracker may be stored. For example, the connection virtualization engine may generate a command tracker entry including the storage command identifier, storage command type, host connection identifier, and completion connection identifier and store it in command tracker data.

At block 820, the storage command may be sent to the corresponding processing queue. For example, the connection virtualization engine may use the completion connection identifier and/or corresponding storage device and processing queue identifiers to route the storage command to the target processing queue.

At block 822, completion of the storage command may be monitored. For example, the connection virtualization engine may monitor for a response message from the target storage device and/or processing queue referencing the storage command identifier. In some embodiments, response messages may include command completion indicators and queue full indicators.

At block 824, a command completion indicator may be received. For example, the connection virtualization engine may receive a response message including parameters for a command completion indicator or similar success notification.

At block 826, the command tracker for the storage command may be read. For example, the connection virtualization engine may read the command tracker entry corresponding to the storage command using the storage command identifier as an index to search the command tracker.

At block 828, the host connection identifier may be determined. For example, the connection virtualization engine may read the host connection identifier for the original storage command from the command tracker entry.

At block 830, the corresponding host completion queue may be determined. For example, the host systems may include completion queues corresponding to their host connection identifiers, allowing the connection virtualization engine to use the host connection identifier to determine the correct completion queue to receive the completion indicator.

At block 832, the completion indicator may be returned to the host system through the correct completion queue. For example, the connection virtualization engine may use the host connection identifier to send the storage command completion indicator and associated parameters in a response message to the host system that will be processed according to the host storage connection that the storage command was sent to.

At block 834, a queue full indicator may be received. For example, the connection virtualization engine may receive a response message include parameters for a queue full indicator or similar error notification.

At block 836, that a queue depth limit for the target processing queue has been reached may be determined. For example, the connection virtualization engine may determine from the queue full indicator that the target processing queue has reached its queue depth limit of pending storage commands and can no longer receive new storage commands until at least one pending storage commend is resolved, reflecting an overflow state for the processing queue.

At block 838, storage resource usage for storage connections may be determined. For example, the connection virtualization engine may monitor the processing queues for current queue depth of pending storage commands or other operating parameters.

At block 840, an available storage connection may be selected. For example, the connection virtualization engine may evaluate the queue depths and select a processing queue with the lowest count of pending storage commands as an alternate processing queue for the storage command that generated the queue full indicator.

At block 842, the completion connection identifier for the selected processing queue may be determined. For example, the connection virtualization engine may identify the completion queue identifier corresponding to the selected processing queue.

At block 844, the command tracker may be updated with the new completion connection identifier. For example, the connection virtualization engine may overwrite the prior completion connection identifier (for the processing queue with the queue full error) with completion connection identifier for the newly selected storage connection. Method 800 may then return to block 820 to retry the storage command by sending it to the new processing queue.

Figure 9:
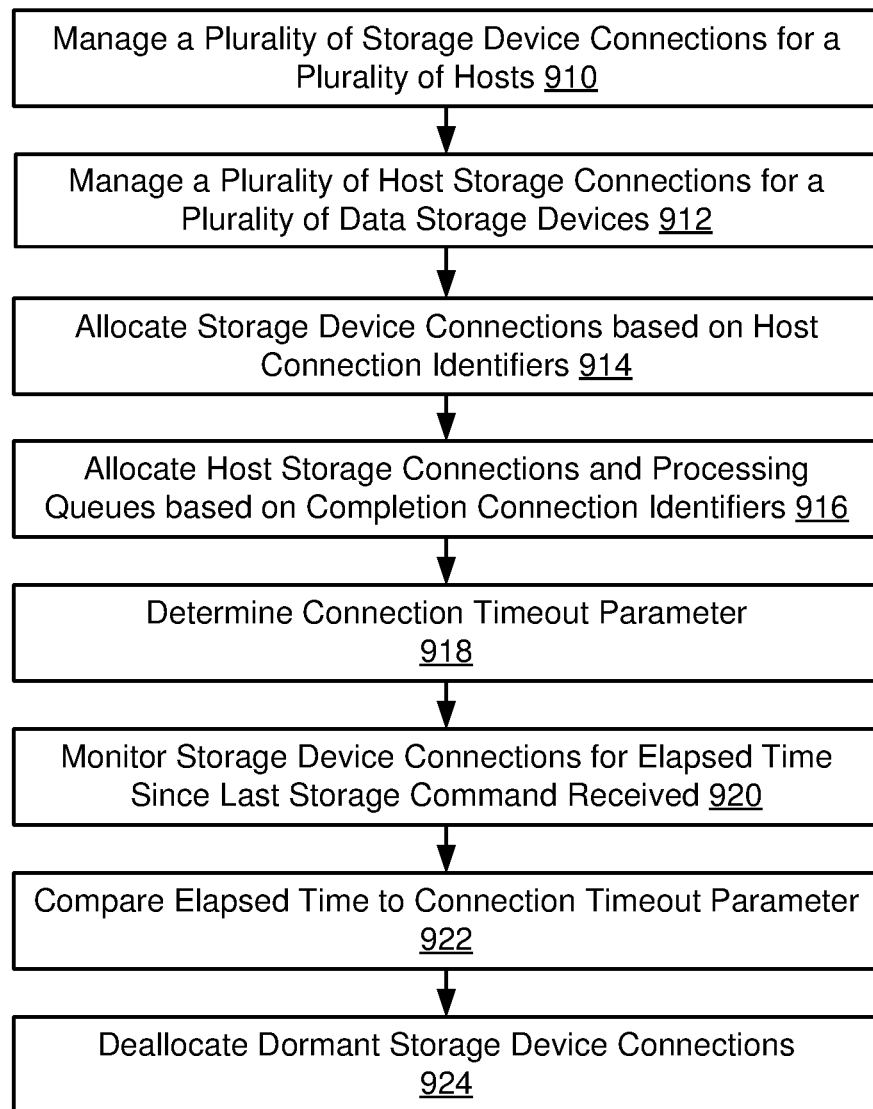
FIG. 9 is a flowchart of an example method of managing host storage connections through a connection virtualization layer.

As shown in FIG. 9, storage node 500 may be operated according to an example method for managing host storage connections through a connection virtualization layer, i.e., according to method 900 illustrated by blocks 910-924 in FIG. 9.

At block 910, a plurality of storage device connections for a plurality of hosts may be managed. For example, the storage node may include multiple storage devices, be configured in a multi-tenant system for processing host storage requests from multiple hosts, and include a connection virtualization engine that receives front-end or host-side storage connection requests for accessing the storage devices.

At block 912, a plurality of host storage connection for a plurality of data storage devices may be managed. For example, the connection virtualization engine may also provide back-end or device-side storage connection requests for completing host storage connections between the hosts and storage devices.

At block 914, storage device connections may be allocated based on host connection identifiers. For example, the connection virtualization engine may receive host connection requests containing host connection identifiers that are used to initiate and govern host storage connections that provide a storage device connection for completing storage commands directed to the host connection identifier.

At block 916, host storage connections and processing queues may be allocated based on completion connection identifiers. For example, the connection virtualization engine may assign completion connection identifiers to target storage devices and processing queues for completing host storage connections without using the host connection identifier to complete the host storage connection on the storage side, thus providing selective indirection between the host connection identifiers and the completion connection identifiers for any host storage connection.

At block 918, a connection timeout parameter may be determined. For example, the connection virtualization engine may be configured with a connection timeout parameter that governs how long an allocated host connection can remain inactive before the host connection identifier is deallocated (rendering the host connection dormant) and/or terminated.

At block 920, storage device connections may be monitored for elapsed time since the last storage command was received and/or completed. For example, the connection virtualization engine may continuously or periodically determine the elapsed time for each host connection identifier.

At block 922, the elapsed time may be compared to the connection timeout parameter. For example, the connection virtualization engine may compare the elapsed time for each host connection identifier to the connection timeout parameter to determine dormant host storage connections that may be deallocated and, in some configurations, terminated.

At block 924, the dormant storage device connections from the host may be deallocated. For example, responsive to the elapsed time meeting or exceeding the connection timeout parameter, the connection virtualization engine may deallocate the host connection identifier from its default completion connection identifier.

Figure 10:
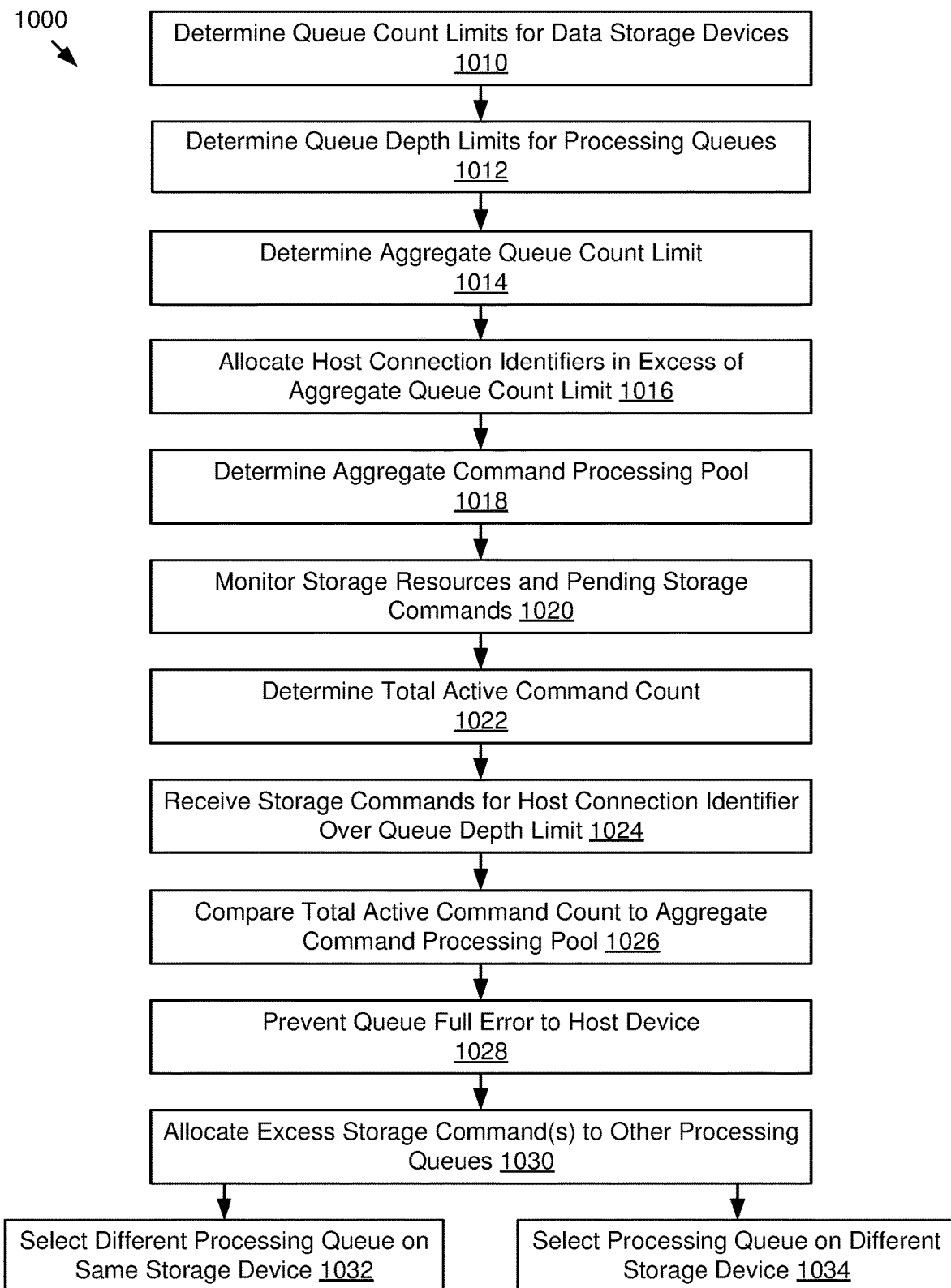
FIG. 10 is a flowchart of an example method of handling host connection and storage command overflow through a connection virtualization layer.

As shown in FIG. 10, storage node 500 may be operated according to an example method for handling host connection and storage command overflow through a connection virtualization layer, i.e., according to method 1000 illustrated by blocks 1010-1034 in FIG. 10.

At block 1010, queue count limits may be determined for data storage devices. For example, each storage device in the storage node may have a queue count limit reflecting the maximum number of processing queues or queue-pairs that storage device can support.

At block 1012, queue depth limits may be determined for data storage devices. For example, each storage device in the storage node may have a queue depth limit reflecting the maximum number of pending storage commands that the storage device can support in each processing queue or queue-pair.

At block 1014, an aggregate queue count limit may be determined. For example, the connection virtualization engine may calculate the aggregate queue count limit by summing the queue count limits of each storage device in the storage node.

At block 1016, host connection identifiers may be allocated in excess of the aggregate queue count limit. For example, the aggregate queue count limit may determine the number of host storage connections that can be allocated on a one-to-one basis and, in some systems, would define a maximum number of concurrent host connection identifiers managed by the storage node. The connection virtualization engine may enable the count of host connection identifiers to exceed the aggregate queue count limit for the storage node.

At block 1018, an aggregate command processing pool may be determined. For example, the connection virtualization engine may calculate the aggregate command processing pool by summing the queue depth limits of all processing queues of all storage devices in the storage node.

At block 1020, storage resources and pending storage commands may be monitored. For example, the connection virtualization engine may collect or access storage device configuration and operating parameters, such as current queue depths of pending storage commands for each processing queue.

At block 1022, a total active command count may be determined. For example, the connection virtualization engine may calculate the total active command count by summing the current queue depths across all processing queues and storage devices.

At block 1024, at least one storage command for a host connection identifier that is over the queue depth limit of the target storage device may be received. For example, a storage device may have a queue depth limit of 16, the host may send 17 or more storage commands to the same host connection identifier without the storage device completing them such that they are all pending at the same time, and the connection virtualization engine may manage the overflow storage commands.

At block 1026, the total active command count may be compared to the aggregate command processing pool. For example, the connection virtualization engine may compare the total active command count determined at block 1022 to the aggregate command processing pool determined at block 1018 to verify that an acceptable amount of processing queue space remains available among all storage devices to accommodate the overflow storage commands.

At block 1028, at least one queue full error may be prevented from reaching the host device that sent the overflow storage command. For example, the connection virtualization engine, responsive to verifying that the total active command count does not exceed a command pool threshold value, may prevent a queue full error from being generated by the default processing queue and/or being passed back to the host in a response.

At block 1030, excess or overflow storage commands may be allocated to other processing queues. For example, the connection virtualization engine may select one or more other processing queues to receive the overflow storage commands.

At block 1032, a different processing queue on the same storage device may be selected. For example, the connection virtualization engine may determine an unused or underused processing queue for the same storage device and select it as the new target processing queue and connection completion identifier.

At block 1034, a processing queue on a different storage device may be selected. For example, the connection virtualization engine may determine an unused or underutilized processing queue for a different storage device in the storage node and select it as the new target processing queue and connection completion identifier.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A system, comprising: a processor; a memory; a storage interface configured to communicate with a plurality of data storage devices, wherein each storage device of the plurality of data storage devices is configured with: a queue count limit corresponding to a number of processing queues supported by the storage device; and a queue depth limit for each processing queue supported by the storage device; a host interface configured to communicate with a plurality of host devices; and a connection virtualization engine configured to: allocate, from a host device among the plurality of host devices, a host storage connection having a host connection identifier; allocate, to a target storage device among the plurality of data storage devices, a first processing queue having a first completion connection identifier; receive, from the host device, a storage command directed to the first processing queue of the target storage device; determine whether the first processing queue of the target storage device has reached the queue depth limit of the first processing queue; determine, responsive to determining that the first processing queue of the target storage device has reached the queue depth limit of the first processing queue, a second processing queue to receive the storage command, wherein the second processing queue has a second completion connection identifier; send the storage command to the second processing queue;

determine, for the plurality of data storage devices, an aggregate queue count limit; determine, for the plurality of data storage devices, an aggregate command processing pool based on the aggregate queue count limit and the queue depth limit for each processing queue; determine a total active command count for active storage commands allocated to the plurality of data storage devices; compare the total active command count to the aggregate command processing pool; and prevent, responsive to the total active command count being less than the aggregate command processing pool, the host device from receiving a queue full error.

2. The system of claim 1, wherein:
the connection virtualization engine is further configured to receive, from the target storage device, a queue full indicator for the first processing queue; and
determining whether the first processing queue of the target storage device has reached the queue depth limit of the first processing queue is based on receiving the queue full indicator.

3. The system of claim 1, wherein:
the connection virtualization engine is further configured to manage a plurality of host storage connections for the target storage device;
each host storage connection of the plurality of host storage connections includes:
a corresponding completion connection identifier; and
a corresponding processing queue; and
the second processing queue and the second completion connection identifier are associated with a second host storage connection of the target storage device.

4. The system of claim 1, wherein:
the connection virtualization engine is further configured to manage a plurality of host storage connections for the plurality of data storage devices; and
the second processing queue and associated second completion connection identifier are associated with a second host storage connection of a second target storage device from the plurality of data storage devices.

5. The system of claim 1, wherein the connection virtualization engine is further configured to:
determine, for a storage connection request from the host device, a first host connection identifier; and
determine, based on the first host connection identifier, the first processing queue of the target storage device.

6. The system of claim 1, wherein the connection virtualization engine is further configured to:
store, for the storage command, a command tracker associating the storage command, the host connection identifier, and the first completion connection identifier corresponding to the first processing queue; and
update, responsive to determining the second processing queue to receive the storage command, the command tracker to include the second completion connection identifier corresponding to the second processing queue.

7. The system of claim 1, wherein the connection virtualization engine is further configured to:
determine, for a storage connection request from the host device, a first host connection identifier;
monitor, from the host device, a plurality of pending storage commands associated with the first host connection identifier;
determine a plurality of host storage connections among the plurality of data storage devices; and
allocate the plurality of pending storage commands among the plurality of host storage connections and corresponding processing queues of the plurality of data storage devices, wherein a count of the pending storage commands associated with the first host connection identifier exceeds the queue depth limit of the first processing queue.

8. The system of claim 1, wherein the connection virtualization engine is further configured to:
manage, from the plurality of host devices, a plurality of host connection requests with corresponding host connection identifiers;
manage, for the plurality of host devices, a plurality of storage device connections with corresponding completion connection identifiers; and
allocate, based on available storage device resources, the plurality of storage device connections between host connection identifiers and completion connection identifiers, wherein:
a count of host connection identifiers exceeds the aggregate queue count limit of the plurality of data storage devices; and
at least one processing queue corresponding to a completion connection identifier includes pending storage commands associated with a plurality of host connection identifiers.

9. The system of claim 8, wherein:
the host interface and the storage interface are configured for a non-volatile memory express storage protocol;
each storage device connection of the plurality of storage device connections is configured as a queue-pair allocation; and
the connection virtualization engine is further configured to:
allocate the plurality of storage device connections to at least one target storage device of the plurality of data storage devices in excess of the queue count limit; and
process storage commands to at least one host connection identifier in excess of the queue depth limit.

10. A computer-implemented method, comprising: allocating, from a host device among a plurality of host devices, a host storage connection having a host connection identifier; allocating, to a target storage device among a plurality of data storage devices, a first processing queue having a first completion connection identifier and a queue depth limit; receiving, from the host device, a storage command directed to the first processing queue of the target storage device; determining whether the first processing queue of the target storage device has reached the queue depth limit of the first processing queue; determining, responsive to determining that the first processing queue of the target storage device has reached the queue depth limit of the first processing queue, a second processing queue to receive the storage command, wherein the second processing queue has a second completion connection identifier; sending the storage command to the second processing queue;
determining, for the plurality of data storage devices, an aggregate queue count limit; determining, for the plurality of data storage devices, an aggregate command processing pool based on the aggregate queue count limit and a queue depth limit for each processing queue of the plurality of data storage devices; determining a total active command count for active storage commands allocated to the plurality of data storage devices; comparing the total active command count to the aggregate command processing pool; and preventing, responsive to the total active command count being less than the aggregate command processing pool, the host device from receiving a queue full error.

11. The computer-implemented method of claim 10, further comprising:
receiving, from the target storage device, a queue full indicator for the first processing queue, wherein determining whether the first processing queue of the target storage device has reached the queue depth limit of the first processing queue is based on receiving the queue full indicator.

12. The computer-implemented method of claim 11, further comprising:
managing a plurality of host storage connections for the target storage device, wherein:
each host storage connection of the plurality of host storage connections includes:
a corresponding completion connection identifier; and
a corresponding processing queue; and
the second processing queue and the second completion connection identifier are associated with a second host storage connection of the target storage device.

13. The computer-implemented method of claim 11, further comprising:
managing a plurality of host storage connections for the plurality of data storage devices, wherein the second processing queue and the second completion connection identifier are associated with a second host storage connection of a second target storage device from the plurality of data storage devices.

14. The computer-implemented method of claim 10, further comprising:
  determining, for a storage connection request from the host device, a first host connection identifier; and
  determining, based on the first host connection identifier, the first processing queue of the target storage device.

15. The computer-implemented method of claim 11, further comprising:
  storing, for the storage command, a command tracker associating the storage command, the host connection identifier, and the first completion connection identifier corresponding to the first processing queue; and
  updating, responsive to determining the second processing queue to receive the storage command, the command tracker to include the second completion connection identifier corresponding to the second processing queue.

16. The computer-implemented method of claim 11, further comprising:
  determining, for a storage connection request from the host device, the host connection identifier;
  monitoring, from the host device, a plurality of pending storage commands associated with the host connection identifier;
  determining a plurality of host storage connections among the plurality of data storage devices; and
  allocating the plurality of pending storage commands among the plurality of host storage connections and corresponding processing queues of the plurality of data storage devices, wherein a count of the plurality of pending storage commands associated with the host connection identifier exceed the queue depth limit of the first processing queue.

17. The computer-implemented method of claim 10, further comprising:
  managing, from the plurality of host devices, a plurality of host connection requests with corresponding host connection identifiers;
  managing, for the plurality of host devices, a plurality of storage device connections with corresponding completion connection identifiers; and
  allocating, based on available storage device resources, the plurality of storage device connections between host connection identifiers and completion connection identifiers, wherein:
    a count of host connection identifiers exceeds the aggregate queue count limit of the plurality of data storage devices; and
    at least one processing queue corresponding to a completion connection identifier includes pending storage commands associated with a plurality of host connection identifiers.

18. A storage system comprising: a processor; a memory; a host interface configured to communicate with a plurality of host devices; a plurality of data storage devices; means for allocating, from a host device among the plurality of host devices, a host storage connection having a host connection identifier; means for allocating, to a target storage device among a plurality of data storage devices, a first processing queue having a first completion connection identifier and a queue depth limit; means for receiving, from the host device, a storage command directed to the first processing queue of the target storage device; means for determining whether the first processing queue of the target storage device has reached the queue depth limit of the first processing queue; means for determining, responsive to determining that the first processing queue of the target storage device has reached the queue depth limit of the first processing queue, a second processing queue to receive the storage command, wherein the second processing queue has a second completion connection identifier; means for sending the storage command to the second processing queue;
  means for determining, for the plurality of data storage devices, an aggregate queue count limit; means for determining, for the plurality of data storage devices, an aggregate command processing pool based on the aggregate queue count limit and a queue depth limit for each processing queue of the plurality of data storage devices; means for determining a total active command count for active storage commands allocated to the plurality of data storage devices; means for comparing the total active command count to the aggregate command processing pool; and means for preventing, responsive to the total active command count being less than the aggregate command processing pool, the host device from receiving a queue full error.

* * * * *